United States Patent
Kimura

(10) Patent No.: US 6,577,453 B2
(45) Date of Patent: Jun. 10, 2003

(54) IMAGE READING APPARATUS

(75) Inventor: Toshihito Kimura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 123 days.

(21) Appl. No.: 09/841,728

(22) Filed: Apr. 25, 2001

(65) Prior Publication Data

US 2002/0043636 A1 Apr. 18, 2002

(30) Foreign Application Priority Data

Apr. 26, 2000 (JP) ........................................ 2000-125891
Mar. 13, 2001 (JP) ........................................ 2001-070547

(51) Int. Cl.$^7$ .............................................. G02B 17/00
(52) U.S. Cl. ...................... 359/730; 359/727; 359/732; 250/458.1; 250/584
(58) Field of Search ................................ 359/196–197, 359/201–202, 204, 209–210, 212, 214–215, 364, 618, 719, 726–727, 730–732, 838–839; 250/458.1, 583–586; 369/112.01, 112.23, 112.29, 118, 121

(56) References Cited

U.S. PATENT DOCUMENTS 4,603,938 A * 8/1986 Kojima et al. ................. 359/19
4,835,380 A * 5/1989 Opheij et al. ................ 250/216
6,326,628 B1 * 12/2001 Kimura et al. ........... 250/458.1

* cited by examiner

*Primary Examiner*—Jordan M. Schwartz
(74) *Attorney, Agent, or Firm*—Sughrue Mion, PLLC

(57) ABSTRACT

An image reading apparatus includes a laser source, a stage on which an image carrier can be placed, a light detector for detecting light released from the image carrier, and an optical head for condensing the laser beam emitted from the laser source onto the image carrier and condensing light released from the image carrier to lead it to the light detector and being two-dimensionally movable parallel to the stage, and a perforated mirror formed with a hole at a center portion thereof, and fixed in a path of the laser beam so that the laser beam can pass through the hole and light released from the image carrier and condensed by the optical head can be reflected thereby in such a manner that a path of the light is branched off from the path of the laser beam.

37 Claims, 14 Drawing Sheets

IMAGE READING APPARATUS

BACKGROUND OF THE INVENTION

The present invention relates to an image reading apparatus and, particularly, to such an apparatus which can read an image at a high speed without increase in cost by moving an optical head at a high speed and scanning an image carrier by a laser beam and can be used in common for an autoradiographic image detecting system, a chemiluminescent image detecting system, an electron microscopic image detecting system and a radiographic diffraction image detecting system using a stimulable phosphor sheet, and a fluorescent image detecting system.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Application Laid Open Nos. 55-12429, 55-116340, 55-163472, 56-11395, 56-104645 and the like).

There is also known an autoradiographic image detection system comprising the steps of employing a similar stimulable phosphor as a detecting material for the radiation, introducing a radioactive labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Publication No. 1-60784, Japanese Patent Publication No. 1-60782, Japanese Patent Publication No. 4-3952 and the like).

There is further known a chemiluminescent image detection system using as a detecting material for detecting light a stimulable phosphor which can absorb, store and record the light energy when it is irradiated with light and which, when it is then stimulated by an electromagnetic wave having a specified wavelength, can release stimulated emission whose light amount corresponds to the amount of light radiation with which it was irradiated, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information (see, for example, U.S. Pat. No. 5,028,793, British Patent Publication GB No. 2,246,197A and the like).

There are further known an electron microscopic image detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see, for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development, which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescent image detecting system using a fluorescent substance as a labeling substance instead of a radioactive labeling substance in the autoradiographic image detecting system is known. According to this system, it is possible to study a genetic sequence, study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescence, detecting the released fluorescence to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescence, detecting the released fluorescence to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescence releasing property, exciting the thus produced fluorescent substance by a stimulating ray to release fluorescence, detecting the fluorescence to produce an image and detecting the distribution of the target DNA on the transfer support. This fluorescence detecting system is advantageous in that a genetic sequence or the like can be easily detected without using a radioactive substance.

Since the autoradiographic image detecting system, the electron microscopic image detecting system, the radiographic diffraction image detecting system, the fluorescent image detecting system and the chemiluminescent image detecting system are used for the similar purposes, it is desirable to develop an image reading apparatus which can be used in common for all of these systems.

In fact, an image reading apparatus which can be used in common for the autoradiographic image detecting system, the chemiluminescent image detecting system, the electron microscopic image detecting system and the radiographic diffraction image detecting system using a stimulable phosphor sheet, and the fluorescent image detecting system has been already developed.

An image reading apparatus used for these system is constituted so as to irradiate a stimulable phosphor layer formed on a stimulable phosphor sheet with a stimulating ray or irradiate a transfer support or a gel support containing a specimen labeled with a fluorescent substance with a stimulating ray, lead stimulated emission released from a stimulable phosphor contained in the stimulable phosphor layer upon being stimulated or fluorescence released from the fluorescent substance labeling the specimen upon being stimulated to a light detector and photoelectrically detect stimulated emission or fluorescence by the light detector. In such an image reading apparatus, since the incident direction of the stimulating ray and the direction of release of stimulated emission or fluorescence coincide with each other, an optical system is employed for separating the light path of stimulated emission or fluorescence and the light path of the stimulating ray.

As this kind of the image reading apparatus, there has been proposed an image reading apparatus constituted so as to move an optical head provided with a mirror and a convex lens in the X direction and the Y direction in order to scan a stimulable phosphor layer formed on a stimulable phosphor sheet, or a transfer support or a gel support, by a laser beam and photoelectrically detect stimulated emission or fluorescence by the steps of reflecting a laser beam emitted from a laser stimulating ray source by a dichroic mirror having a property of transmitting stimulated emission or fluorescence, further reflecting the laser beam by another mirror, thereby causing the laser beam to advance to the optical head, condensing the laser beam by the mirror provided in the optical head onto a stimulable phosphor layer formed on a stimulable phosphor sheet, or a transfer support or a gel support, making stimulated emission released from a stimulable phosphor contained in the stimulable phosphor layer upon being stimulated or fluorescence released from a fluorescent substance labeling a specimen upon being stimulated a parallel beam by the convex lens provided in the optical head, reflecting the stimulated emission or the fluorescence by the mirror provided in the optical head to be directed in the same direction as the path of the laser beam, reflecting the stimulated emission or the fluorescence by the mirror, thereby causing it to advance the dichroic mirror, and photoelectrically detecting the stimulated emission or the fluorescence transmitted through the dichroic mirror by a light detector.

There has further been proposed an image reading apparatus constituted so as to scan a stimulable phosphor layer formed on a stimulable phosphor sheet, or a transfer support or a gel support, by a laser beam by moving an optical head provided with a reflection mirror, a perforated mirror formed with a hole at the center portion thereof and a convex lens in the X direction and the Y direction and photoelectrically detect stimulated emission or fluorescence by the steps of reflecting a laser beam emitted from a laser stimulating ray source by the reflection mirror provided in the optical head, thereby leading it to the hole formed in the perforated mirror, condensing the laser beam transmitted through the hole formed in the perforated mirror by the convex lens provided in the optical head onto a stimulable phosphor layer formed on a stimulable phosphor sheet, or a transfer support or a gel support, making stimulated emission released from a stimulable phosphor contained in the stimulable phosphor layer upon being stimulated or fluorescence released from a fluorescent substance labeling a specimen upon being stimulated a parallel beam by the convex lens provided in the optical head, reflecting the stimulated emission or the fluorescence by the perforated mirror provided in the optical head to be directed in the opposite direction to the path of the laser beam, further reflecting the stimulated emission or the fluorescence by one, two or more mirrors, thereby leading it to a light detector.

However, in the former image reading apparatus, a different dichroic mirror has to be employed depending upon the wavelength of the laser beam. Therefore, in the most commonly used image reading apparatus provided with three laser stimulating ray sources (a first one for emitting a laser beam having a wavelength of 470 to 480 nm, a second one for emitting a laser beam having a wavelength of 530 to 540 nm and a third one for emitting a laser beam having a wavelength of 630 to 640 nm) so as to achieve efficient stimulation of fluorescent substances, a dichroic mirror has to be interchanged every time a different laser stimulating ray source is used, making the operation very troublesome. Further, since three kinds of dichroic mirror have to be kept on hand, the cost is inevitably increased. Moreover, although the optical head has to be moved at a high speed, for example, 2 to 3 meter/second, in order to scan a stimulable phosphor layer formed on a stimulable phosphor sheet, or a transfer support or a gel support, by a laser beam at a high speed, since the optical head is provided with a mirror and a convex lens and is relatively heavy, it is difficult to move the optical head at a high speed and, therefore, it is difficult to read an image at a high speed.

In the latter image reading apparatus, even when a laser stimulating ray source for emitting a laser beam having a different wavelength is used, it is unnecessary to interchange a dichroic mirror, and even when a plurality of laser stimulating ray sources for emitting laser beams having different wavelengths are provided, it is unnecessary to provide a dichroic mirror for each laser stimulating ray source.

However, since the optical head is provided with a reflection mirror, a perforated mirror formed with a hole at the center portion thereof and a convex lens and is therefore relatively heavy, it is difficult to move the optical head at a high speed and, therefore, it is difficult to read an image at a high speed.

SUMMARY OF THE INVENTION

It is therefore an object of the present invention to provide, without increase in cost, an image reading apparatus which can read an image at a high speed by moving an optical head at a high speed and scanning an image carrier by a laser beam and can be used in common for an autoradiographic image detecting system, a chemiluminescent image detecting system, an electron microscopic image detecting system and a radiographic diffraction image detecting system using a stimulable phosphor sheet, and a fluorescent image detecting system.

The above and other objects of the present invention can be accomplished by an image reading apparatus comprising at least one laser stimulating ray source for emitting a laser beam, a stage on which an image carrier can be placed, a light detecting means for photoelectrically detecting light released from the image carrier, and an optical head for condensing the laser beam emitted from the at least one laser stimulating ray source onto the image carrier placed on the stage and condensing light released from the image carrier to lead it to the light detecting means, the optical head being constituted to be two-dimensionally movable in a plane parallel to the stage and provided with a perforated mirror fixed in a path of the laser beam and formed with a hole at a center portion thereof, the perforated mirror being disposed so that the laser beam emitted from the at least one laser stimulating ray source can pass through the hole and light released from the image carrier and condensed by the optical head can be reflected in such a manner that a path of the light is branched off from the path of the laser beam emitted from the at least one laser stimulating ray source and advancing to the optical head.

According to the present invention, a perforated mirror formed with a hole at the center portion thereof is provided in the path of the laser beam emitted from the at least one laser stimulating ray source so that the laser beam emitted from the at least one laser stimulating ray source can pass through the hole and light released from the image carrier and condensed by the optical head can be reflected in such a manner that a path of the light is branched off from a path of the laser beam emitted from the at least one laser stimulating ray source and advancing to the optical head. As a result, the laser beam can be led to the optical head via the hole of the perforated mirror irrespective of the wavelength of the laser beam and light released from the image carrier and condensed by the optical head can be reflected by the perforated mirror irrespective of the wavelength of the light so that the light path is branched off from the path of the laser beam emitted from the at least one laser stimulating ray source and advancing to the optical head. It is therefore possible to stimulate the image carrier and read an image using laser stimulating ray sources for emitting laser beams having different wavelengths only by providing one perforated mirror. Therefore, the cost of the image reading apparatus can be reduced.

Further, according to the present invention, the optical head for scanning the image carrier by the laser beam merely serves to condense the laser beam emitted from the at least one laser stimulating ray source and condense light released from the image carrier to lead it to the light detecting means. Unlike a conventional optical head, therefore, the optical head need not be provided with a reflection mirror, a perforated mirror formed with a hole at the center portion thereof and a condensing optical system such as a convex lens. Since the weight of the optical head can be considerably reduced as compared with the conventional optical head, therefore the image carrier can be scanned by the laser beam at a high speed by two-dimensionally moving the optical head in a plane parallel to the stage, thereby markedly improving the image reading speed.

In a preferred aspect of the present invention, the optical head further includes a reflection mirror for directing the laser beam emitted from the at least one laser stimulating ray source toward the image carrier placed on the stage, and a lens system for condensing the laser beam emitted from the at least one laser stimulating ray source and reflected by the reflection mirror onto the image carrier, making light released from the image carrier a parallel beam and causing it to impinge on the reflection mirror, the reflection mirror being constituted so as to reflect the light released from the image carrier and made a parallel beam by the lens system toward the perforated mirror.

According to this preferred aspect of the present invention, since, unlike a conventional optical head, the optical head need not be provided with a reflection mirror, a perforated mirror formed with a hole at the center portion thereof and a condensing optical system such as a convex lens but is provided with only the reflection mirror and the lens system, the weight of the optical head can be markedly reduced as compared with the conventional optical head. Therefore, the image carrier can be scanned by the laser beam at a high speed by two-dimensionally moving the optical head in a plane parallel to the stage, thereby markedly improving the image reading speed.

In another preferred aspect of the present invention, the optical head further includes a concave mirror for directing the laser beam emitted from the at least one laser stimulating ray source toward the image carrier, condensing it onto the image carrier and reflecting light released from the image carrier toward the perforated mirror so as to be made a parallel beam.

According to this preferred aspect of the present invention, since the optical head is provided with only the concave mirror for directing the laser beam emitted from the at least one laser stimulating ray source toward the image carrier, condensing it onto the image carrier and reflecting light released from the image carrier toward the perforated mirror so as to be made a parallel beam, the weight of the optical head can be markedly reduced as compared with the conventional optical head including a reflection mirror, a perforated mirror and a convex lens. Therefore, the image carrier can be scanned by the laser beam at a high speed by two-dimensionally moving the optical head in a plane parallel to the stage, thereby markedly improving the image reading speed.

In a further preferred aspect of the present invention, the lens system is constituted by an aspherical lens.

In another preferred aspect of the present invention, the lens system is constituted by a convex lens.

In a further preferred aspect of the present invention, the image reading apparatus includes two or more laser stimulating ray sources for emitting laser beams having different wavelengths from each other.

According to this preferred aspect of the present invention, since the image reading apparatus includes two or more laser stimulating ray sources for emitting laser beams having different wavelengths from each other, images carried in image carriers containing specimens labeled with fluorescent substances which can be efficiently excited by laser beams whose wavelengths are different from each other and a stimulable phosphor layer formed on a stimulable phosphor sheet recording locational information regarding a radioactive labeling substance can be read by a single image reading apparatus with high efficiency.

In a further preferred aspect of the present invention, the image reading apparatus further includes a condensing optical system for leading the light released from the image carrier, condensed by the optical head and reflected by the perforated mirror to the light detecting means.

In the case where a fluorescent image carried in a transfer support or a gel support, particularly an agarose gel support, is to be read, a fluorescent substance is distributed in the depth direction of the support and light releasing points are distributed in the depth direction of the support when the fluorescent substance is stimulated. Therefore, when it is attempted to use the optical head to condense fluorescence released from a transfer support or a gel support onto the light detecting means, the beam of fluorescence diverges and fluorescence released from the deep portions of a transfer support or a gel support does not impinge on the light detecting means and is not detected by the light detecting means. It is therefore difficult to read a fluorescent image with markedly improved sensitivity. However, according to this preferred aspect of the present invention, since the image reading apparatus further includes a condensing optical system for leading the light released from the image carrier, condensed by the optical head and reflected by the perforated mirror to the light detecting means, the light detecting means can reliably detect fluorescence released from the deep portions of a transfer support or a gel support. It is therefore possible to read a fluorescent image with markedly improved sensitivity.

In a further preferred aspect of the present invention, the image reading apparatus further includes a stimulating ray cut filter unit provided with two or more stimulating ray cut filters each having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and the stimulating ray cut filter unit is constituted to be movable so that one of the two or more stimulating ray cut filters is selectively located in a path of light released from the image carrier, condensed by the optical head and reflected by the perforated mirror.

According to this preferred aspect of the present invention, the image reading apparatus further includes a stimulating ray cut filter unit provided with two or more stimulating ray cut filters each having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources, and the stimulating ray cut filter unit is constituted to be movable so that one of the two or more stimulating ray cut filters is selectively located in a path of light released from the image carrier, condensed by the optical head and reflected by the perforated mirror. It is therefore possible to prevent noise caused by detecting a stimulating ray by the light detecting means from being generated in the image data.

In a further preferred aspect of the present invention, the condensing optical system is constituted so as to lead light transmitted through the stimulating ray cut filter unit to the light detecting means.

In another preferred aspect of the present invention, the condensing optical system is constituted so as to condense light released from the image carrier, condensed by the optical head and reflected by the perforated mirror onto the stimulating ray cut filter unit, thereby leading it to the light detecting means.

In a further preferred aspect of the present invention, the image reading apparatus further includes a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources, and the stimulating ray cut filter module is constituted to be exchangeable and locatable in a path of light released from the image carrier, condensed by the optical head and reflected by the perforated mirror.

According to this preferred aspect of the present invention, the image reading apparatus further includes a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and the stimulating ray cut filter module is constituted to be exchangeable and locatable in a path of light released from the image carrier, condensed by the optical head and reflected by the perforated mirror. It is therefore possible to prevent noise caused by detecting a stimulating ray by the light detecting means from being generated in the image data by selecting an appropriate stimulating ray cut filter module in accordance with the wavelength of the laser beam to be used for stimulating a labeling substance and locating the thus selected stimulating ray cut filter module in the path of light released from the image carrier, condensed by the optical head and reflected by the perforated mirror.

In a further preferred aspect of the present invention, the condensing optical system is constituted so as to lead light transmitted through the stimulating ray cut filter module to the light detecting means.

In another preferred aspect of the present invention, the condensing optical system is constituted so as to condense light released from the image carrier, condensed by the optical head and reflected by the perforated mirror onto the stimulating ray cut filter module, thereby leading it to the light detecting means.

In a further preferred aspect of the present invention, the image reading apparatus further includes a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and a condensing optical system for leading light released from the image carrier, condensed by the optical head and reflected by the perforated mirror to the light detecting means, and the stimulating ray cut filter module is constituted to be exchangeable and locatable in a path of light released from the image carrier, condensed by the optical head and reflected by the perforated mirror.

In the case where a fluorescent image carried in a transfer support or a gel support, particularly an agarose gel support, is to be read, a fluorescent substance is distributed in the depth direction of the support and light releasing points are distributed in the depth direction of the support when the fluorescent substance is stimulated. Therefore, when it is attempted to use the optical head to condense fluorescence released from a transfer support or a gel support onto the light detecting means, the beam of fluorescence diverges and fluorescence released from the deep portions of a transfer support or a gel support does not impinge on the light detecting means and is not detected by the light detecting means. It is therefore difficult to read a fluorescent image with markedly improved sensitivity. However, according to this preferred aspect of the present invention, the image reading apparatus further includes a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and a condensing optical system for leading light released from the image carrier, condensed by the optical head and reflected by the perforated mirror to the light detecting means, and the stimulating ray cut filter module is constituted to be exchangeable and locatable in the path of light released from the image carrier, condensed by the optical head and reflected by the perforated mirror. As a result, the light detecting means can reliably detect fluorescence released from the deep portions of a transfer support or a gel support. It is therefore possible to read a fluorescent image with markedly improved sensitivity. On the other hand, in the case of stimulating a stimulable phosphor contained in a stimulable phosphor layer formed on a stimulable phosphor sheet by a laser beam, since stimulated emission is released from a portion in the vicinity of the surface of the stimulable phosphor layer formed on the stimulable phosphor sheet, the optical head enables the light detecting means to reliably detect the stimulated emission, whereas if stimulated emission should be led to the light detecting means using the condensing optical system, the beam of the stimulated emission would diverge and a part of the stimulated emission might not be detected by the light detecting means. However, according to this preferred aspect of the present invention, the stimulating ray cut filter module is constituted to be exchangeable. Therefore, when an image of a radioactive labeling substance recorded in a stimulable phosphor layer formed on a stimulable phosphor sheet is read, the light detecting means can reliably detect stimulated emission released from the stimulable phosphor layer formed on the stimulable phosphor sheet by replacing the stimulating ray cut filter module having a condensing optical system for a stimulating ray cut filter module having no condensing optical system. It is therefore possible to read an image of a radioactive labeling substance with markedly improved sensitivity.

In a further preferred aspect of the present invention, the condensing optical system is constituted so as to lead light transmitted through the stimulating ray cut filter to the light detecting means.

In another preferred aspect of the present invention, the condensing optical system is constituted so as to condense light released from the image carrier, condensed by the optical head and reflected by the perforated mirror onto the stimulating ray cut filter, thereby leading it to the light detecting means.

In a further preferred aspect of the present invention, the condensing optical system is constituted by a convex lens.

According to this preferred aspect of the present invention, since the condensing optical system is constituted by a convex lens, the stimulating ray cut filter module can be made compact, thereby enabling the stimulating ray cut filter module to be easily handled and making the image reading apparatus small.

In another preferred aspect of the present invention, the condensing optical system is constituted by a concave mirror.

In a further preferred aspect of the present invention, the image reading apparatus includes a first light detecting means and a second light detecting means for photoelectrically detecting light emitted from the image carrier, and a stimulating ray cut filter module provided with a first stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from said one of the laser stimulating ray sources, a second stimulating ray cut filter having a property of cutting off light having a wavelength of the laser beam emitted from a laser stimulating ray source different from said one of the laser stimulating ray sources among the two or more laser stimulating ray sources and transmitting light having a wavelength longer than the wavelength of the laser beam emitted from the laser stimulating ray source different from said one of the laser stimulating ray sources, a dichroic mirror having a property of reflecting light having a wavelength longer than the wavelength of the laser beam emitted from said one of the laser stimulating ray sources and transmitting light having a wavelength longer than the wavelength of the laser beam emitted from the laser stimulating ray source different from said one of the laser stimulating ray sources, a first condensing optical system for condensing light released from the image carrier and reflected by the dichroic mirror onto the first light detecting means, and a second light detecting means for condensing light released from the image carrier and transmitted through the dichroic mirror onto the second light detecting means, the stimulating ray cut filter module being constituted to be exchangeable and locatable in a path of the light released from the image carrier, condensed by the optical head and reflected by the perforated mirror.

In the case where a fluorescent image carried in a transfer support or a gel support, particularly an agarose gel support, is to be read, a fluorescent substance is distributed in the depth direction of the support and light releasing points are distributed in the depth direction of the support when the fluorescent substance is stimulated. Therefore, when it is attempted to use the optical head to condense fluorescence released from a transfer support or a gel support onto the light detecting means, the beam of fluorescence diverges and fluorescence released from the deep portions of a transfer support or a gel support does not impinge on the light detecting means and is not detected by the light detecting means. It is therefore difficult to read a fluorescent image with markedly improved sensitivity. However, according to this preferred aspect of the present invention, the image reading apparatus includes a first light detecting means and a second light detecting means for photoelectrically detecting light emitted from the image carrier, and a stimulating ray cut filter module provided with a first stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from said one of the laser stimulating ray sources, a second stimulating ray cut filter having a property of cutting off light having a wavelength of the laser beam emitted from a laser stimulating ray source different from said one of the laser stimulating ray sources among the two or more laser stimulating ray sources and transmitting light having a wavelength longer than the wavelength of the laser beam emitted from the laser stimulating ray source different from said one of the laser stimulating ray sources, a dichroic mirror having a property of reflecting light having a wavelength longer than the wavelength of the laser beam emitted from said one of the laser stimulating ray sources and transmitting light having a wavelength longer than the wavelength of the laser beam emitted form the laser stimulating ray source different from said one of the laser stimulating ray sources, a first condensing optical system for condensing light released from the image carrier and reflected by the dichroic mirror onto the first light detecting means, and a second light detecting means for condensing light released from the image carrier and transmitted through the dichroic mirror onto the second light detecting means, the stimulating ray cut filter module being constituted to be exchangeable and locatable in the path of the light released from the image carrier, condensed by the optical head and reflected by the perforated mirror. As a result, the first light detecting means and the second light detecting means can reliably detect fluorescence released from the deep portions of a transfer support or a gel support. It is therefore possible to read a fluorescent image with markedly improved sensitivity. On the other hand, in the case of stimulating a stimulable phosphor contained in a stimulable phosphor layer formed on a stimulable phosphor sheet by a laser beam, since stimulated emission is released from a portion in the vicinity of the surface of the stimulable phosphor layer formed on the stimulable phosphor sheet, the optical head enables the first light detecting means or the second light detecting means to reliably detect the stimulated emission, whereas if stimulated emission should be led to the first light detecting means or the second light detecting means using the condensing optical system, the beam of the stimulated emission would diverge and a part of the stimulated emission might not be detected by the first light detecting means or the second light detecting means. However, according to this preferred aspect of the present invention, the stimulating ray cut filter module is constituted to be exchangeable. Therefore, when an image of a radioactive labeling substance recorded in a stimulable phosphor layer formed on a stimulable phosphor sheet is read, the first light detecting means or the second light detecting means can reliably detect stimulated emission released from the stimulable phosphor layer formed on the stimulable phosphor sheet by replacing the stimulating ray cut filter module having a condensing optical system for a stimulating ray cut filter module having no condensing optical system. It is therefore possible to read an image of a radioactive labeling substance with markedly improved sensitivity.

Further, according to this preferred aspect of the present invention, it is possible to simultaneously irradiate an image carrier carrying a fluorescent image of a specimen selectively labeled with two kinds of fluorescent substances by laser beams emitted from two laser stimulating ray sources, thereby stimulating the two kinds of fluorescent substances capable of being efficiently stimulated by light of different wavelength by two laser beams having different wavelengths, and simultaneously detect fluorescence released from the two kinds of fluorescent substances using the first light detecting means and the second light detecting means to thereby obtain two fluorescent images corresponding to the respective fluorescent substances.

In a further preferred aspect of the present invention, the first condensing optical system is constituted so as to lead light transmitted through the first stimulating ray cut filter to the first light detecting means.

In another preferred aspect of the present invention, the first condensing optical system is constituted so as to condense light released from the image carrier and reflected by the dichroic mirror onto the first stimulating ray cut filter, thereby leading it to the first light detecting means.

In a further preferred aspect of the present invention, the second condensing optical system is constituted so as to lead light transmitted through the second stimulating ray cut filter to the second light detecting means.

In another preferred aspect of the present invention, the second condensing optical system is constituted so as to condense light released from the image carrier and transmitted through the dichroic mirror onto the second stimulating ray cut filter, thereby leading it to the second light detecting means.

In a further preferred aspect of the present invention, the first condensing optical system is constituted by a convex lens.

According to this preferred aspect of the present invention, since the first condensing optical system is constituted by a convex lens, the stimulating ray cut filter module can be made compact, thereby enabling the stimulating ray cut filter module to be easily handled and making the image reading apparatus small.

In a further preferred aspect of the present invention, the second condensing optical system is constituted by a convex lens.

According to this preferred aspect of the present invention, since the second condensing optical system is constituted by a convex lens, the stimulating ray cut filter module can be made compact, thereby enabling the stimulating ray cut filter module to be easily handled and making the image reading apparatus small.

In a further preferred aspect of the present invention, the first condensing optical system is constituted by a concave mirror.

In a further preferred aspect of the present invention, the second condensing optical system is constituted by a concave mirror.

In a preferred aspect of the present invention, the at least one laser stimulating ray source includes at least one built-in laser stimulating ray source and the image reading apparatus further includes an external laser stimulating ray source unit including a single case, at least two external laser stimulating ray sources accommodated in the case, at least two optical fiber members each for leading a laser beam emitted from one of the at least two external laser stimulating ray sources to a main body of the image reading apparatus, and a single protective tube member for covering and protecting the at least two optical fiber members.

According to this preferred aspect of the present invention, the external laser stimulating unit including at least two laser stimulating ray sources accommodated in the case and laser beams emitted from the at least two laser stimulating ray sources are led via separate optical fiber members to the main body of the image reading apparatus and the at least two optical fiber members are covered and protected by a single protective tube member. Therefore, the cost of the image reading apparatus can be considerably reduced as compared with an image reading apparatus in which external laser stimulating ray sources are accommodated in separate cases and laser beams emitted from the external laser stimulating ray sources are led to the main body of the image reading apparatus by separate optical fiber members and covered by separate protective tube members.

In a further preferred aspect of the present invention, the image carrier includes a support for carrying a fluorescent image produced by a fluorescent image detection system.

In a further preferred aspect of the present invention, the image carrier includes a stimulable phosphor sheet selected from a group consisting of a stimulable phosphor sheet for carrying an autoradiographic image, a stimulable phosphor sheet carrying an electron microscopic image, a stimulable phosphor sheet carrying a radiographic diffraction image and a stimulable phosphor sheet carrying a chemiluminescent image.

In the present invention, the stimulable phosphor usable for recording an autoradiographic image, an electron microscopic image or a radiation diffraction image in a stimulable phosphor sheet may be of any type insofar as it can store radiation energy or electron beam energy and can be stimulated by an electromagnetic wave to release the radiation energy or the electron beam energy stored therein in the form of light. More specifically, preferably employed stimulable phosphors include alkaline earth metal fluorohalide phosphors $(Ba_{1-x}, M^{2+}_x)FX:yA$ (where $M^{2+}$ is at least one alkaline earth metal selected from the group consisting of Mg, Ca, Sr, Zn and Cd; X is at least one element selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat. No. 4,239,968, alkaline earth metal fluorohalide phosphors SrFX:Z (where X is at least one halogen selected from the group consisting of Cl, Br and I; Z is at least one Eu and Ce.) disclosed in Japanese Patent Application Laid Open No. 2-276997, europium activated complex halide phosphors BaFXxNaX':aEu$^{2+}$ (where each of X or X' is at least one halogen selected from the group consisting of Cl, Br and I; x is greater than 0 and equal to or less than 2; and y is greater than 0 and equal to or less than 0.2.) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br and I; and x is greater than 0 and equal to or less than 0.1.) disclosed in U.S. Pat. No. 4,539,137 and europium activated complex halide phosphors $M^{II}FXaM^{I}X'bM^{II}X''_2cM^{III}X'''_3xA:yEu^{2+}$ (where $M^{II}$ is at least one alkaline earth metal selected from the group consisting of Ba, Sr and Ca; $M^{I}$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Ti; A is at least one metal oxide; X is at least one halogen selected from the group consisting of Cl, Br and I; each of X', X" and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) disclosed in U.S. Pat. No. 4,962,047.

In the present invention, the stimulable phosphor usable for recording a chemiluminescent image in a stimulable phosphor sheet may be of any type insofar as it can store the energy of light in the wavelength band of visible light and can be stimulated by an electromagnetic wave to release in the form of light the energy of the light in the wavelength band of visible light stored therein. More specifically, preferably employed stimulable phosphors include at least one selected from the group consisting of metal halophosphates, rare-earth-activated sulfide-host phosphors, aluminate-host phosphors, silicate-host phosphors, fluoridehost phosphors and mixtures of two, three or more of these phosphors. Among them, rare-earth-activated sulfide-host phosphors are more preferable and, particularly, rare-earth-activated alkaline earth metal sulfide-host phosphors disclosed in U.S. Pat. Nos. 5,029,253 and 4,983,834 are most preferable.

The above and other objects and features of the present invention will become apparent from the following description made with reference to the accompanying drawings.

DESCRIPTION OF THE PREFERRED EMBODIMENT

Figure 1:
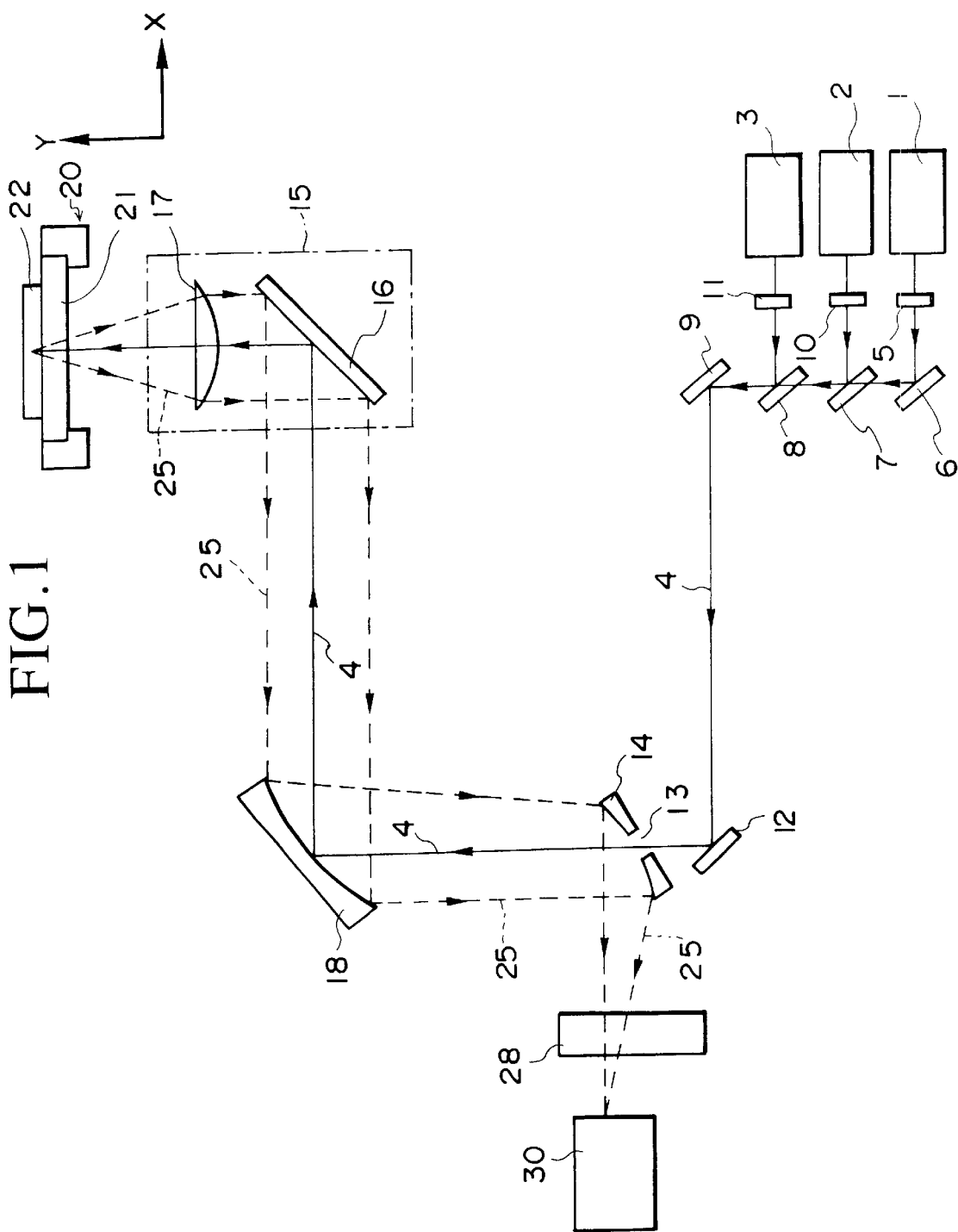
FIG. 1 is a schematic perspective view showing an image reading apparatus which is a preferred embodiment of the present invention.
Figure 2:
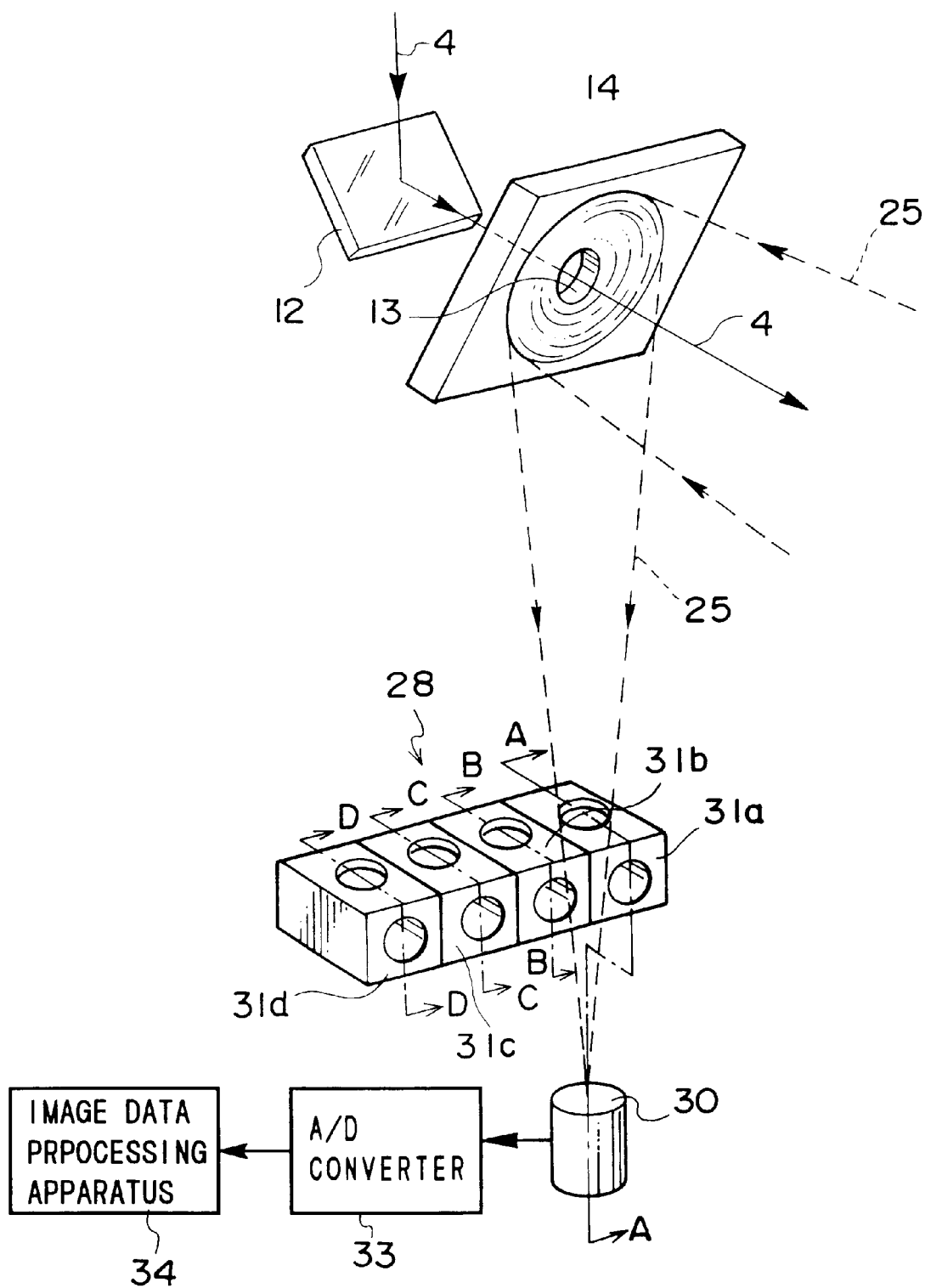
FIG. 2 is a schematic perspective view showing details in the vicinity of a photomultiplier.

FIG. 1 is a schematic perspective view showing an image reading apparatus which is a preferred embodiment of the present invention and FIG. 2 is a schematic perspective view showing the details in the vicinity of a photomultiplier.

As shown in FIG. 1, an image reading apparatus includes a first laser stimulating ray source 1 for emitting a laser beam having a wavelength of 640 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 is constituted by a semiconductor laser beam source and the second laser stimulating ray source 2 and the third laser stimulating ray source 3 are constituted by a second harmonic generation element.

A laser beam 4 emitted from the first laser stimulating source 1 passes through a collimator lens 5, thereby being made a parallel beam and is reflected by a mirror 6. A first dichroic mirror 7 for transmitting light having a wavelength of 640 nm but reflecting light having a wavelength of 532 nm and a second dichroic mirror 8 for transmitting light having a wavelength equal to and longer than 532 nm but reflecting light having a wavelength of 473 nm are provided in an optical path of the laser beam 4 emitted from the first laser stimulating ray source 1. The laser beam 4 emitted from the first laser stimulating ray source 1 and reflected by the mirror 6 passes through the first dichroic mirror 7 and the second dichroic mirror 8 and enters a mirror 9.

On the other hand, the laser beam 4 emitted from the second laser stimulating ray source 2 passes through a collimator lens 10, thereby being made a parallel beam and is reflected by the first dichroic mirror 7, thereby changing its direction by 90 degrees. The laser beam 4 then passes through the second dichroic mirror 8 and enters the mirror 9.

Further, the laser beam 4 emitted from the third laser stimulating ray source 3 passes through a collimator lens 11, thereby being made a parallel beam and is reflected by the second dichroic mirror 8, thereby changing its direction by 90 degrees. The laser beam 4 then enters the mirror 9.

The laser beam 4 entering the mirror 9 is reflected by the mirror 9 and enters a mirror 12 to be reflected thereby.

A perforated mirror 14 formed with a hole 13 at the center portion thereof is provided in an optical path of the laser beam 4 reflected by the mirror 12. The laser beam 4 reflected by the mirror 12 passes through the hole 13 of the perforated mirror 14 and advances to a concave mirror 18.

The laser beam 4 advancing to the concave mirror 18 is reflected by the concave mirror 18 and enters an optical head 15.

The optical head 15 includes a mirror 16 and an aspherical lens 17. The laser beam 4 entering the optical head 15 is reflected by the mirror 16 and condensed by the aspherical lens 17 onto an image carrier held by a sample carrier (not shown) and set on the stage 20.

The image reading apparatus according to this embodiment is constituted so as to be able to read an electrophoresis image of denatured DNA fragments labeled with fluorescent dye and recorded in a gel support or a transfer support and an autoradiographic image regarding locational information of a radioactive labeling substance recorded in a stimulable phosphor layer formed on a stimulable phosphor sheet and, therefore, the image carrier 22 may be a gel support or a transfer support, or a stimulable phosphor sheet.

An electrophoresis image of denatured DNA fragments labeled with a fluorescent dye is, for example, recorded in a transfer support in the following manner.

First, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support are stacked to transfer at least a part of the denatured DNA fragments onto the transfer support and the transferred DNA fragments are fixed on the transfer support by heating and irradiating with an ultraviolet ray.

Further, probes prepared by labeling DNA or RNA with fluorescent dye, which is complementary to the DNA containing the specific gene, and the denatured DNA fragments on the transfer support are hybridized by heating to form double-stranded DNA fragments or combined DNA and RNA. Then, DNA or RNA which is complementary to the DNA containing DNA of the specific gene is labeled with a fluorescent dye such as Fluorescein (registered trademark), Rhodamine (registered trademark) or Cy5 (registered trademark) to prepare the probes. Since the denatured DNA fragments are fixed on the transfer support at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support to be fluorescently labeled. The thus obtained transfer support records an electrophoresis image of the denatured DNA labeled with fluorescent dye.

Further, locational information regarding a radioactive labeling substance is recorded in a stimulable phosphor layer formed on the stimulable sheet in following manner. Here, locational information as termed here includes a variety of information relating to the location of radioactive labeled substances, or aggregations thereof, present in a specimen, such as the location, the shape, the concentration, the distribution or combinations thereof.

When locational information regarding a radioactive labeling substance for example, in a gene obtained using a Southern blot-hybridization method is to be recorded in the stimulable phosphor layer formed on the stimulable sheet, first, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating and irradiating with an ultraviolet ray.

Further, probes prepared by radioactive labeling DNA or RNA which is complementary to the DNA containing the specific gene and the denatured DNA fragments are hybridized by heating to form double-stranded DNA fragments or combined DNA and RNA. Since the denatured DNA fragments are fixed on the transfer support at this time, only the DNA fragments which are complimentary to the probe DNA or probe RNA are hybridized to acquire the radioactive labeled probe.

Then, the probes which have not formed hybrids are removed by washing with a proper solution and only the DNA fragments having a specific gene form hybrids with the radioactive labeled DNA or RNA on the transfer support to be radioactively labeled. The thus obtained transfer support is dried and the transfer support and the stimulable phosphor sheet are stacked for a certain period of time to expose the stimulable phosphor layer and at least a part of the radiation emitted from the radioactive labeling substance on the transfer support is absorbed in the stimulable phosphor layer formed on the stimulable phosphor sheet, whereby the locational information regarding the radioactive labeling substance in the specimen is stored in the form of an image in the stimulable phosphor layer.

When the laser beam 4 is impinged on the image carrier 21 carrying an image of a fluorescent substance such as a gel support or a transfer support, a fluorescent substance is stimulated, thereby releasing fluorescence and when the laser beam 4 is impinged on the image carrier 22 constituted by a stimulable phosphor sheet carrying a radiation image, a stimulable phosphor is stimulated, thereby releasing stimulated emission.

The fluorescence 25 released from a gel support or a transfer support or the stimulated emission 25 released from a stimulable phosphor sheet is condensed onto the mirror 16 by the aspherical lens 17 provided in the optical head 15 and reflected by the mirror 16 on the side of the optical path of the laser beam 4, thereby being made a parallel beam to advance to the concave mirror 18.

The fluorescence 25 or the stimulated emission 25 advancing to the concave mirror 18 is reflected by the concave mirror 18 and advances to the perforated mirror 14.

As shown in FIG. 2, the fluorescence 25 or the stimulated emission 25 advancing to the perforated mirror 14 is reflected downward by the perforated mirror 14 formed by a concave mirror and advances to a filter unit 28, whereby light having a predetermined wavelength is cut. The fluorescence 25 or the stimulated emission 25 then impinges on a photomultiplier 30, thereby being photoelectrically detected.

As shown in FIG. 2, the filter unit 28 is provided with four filter members 31a, 31b, 31c and 31d and is constituted to be laterally movable in FIG. 2 by a motor (not shown).

Figure 3:
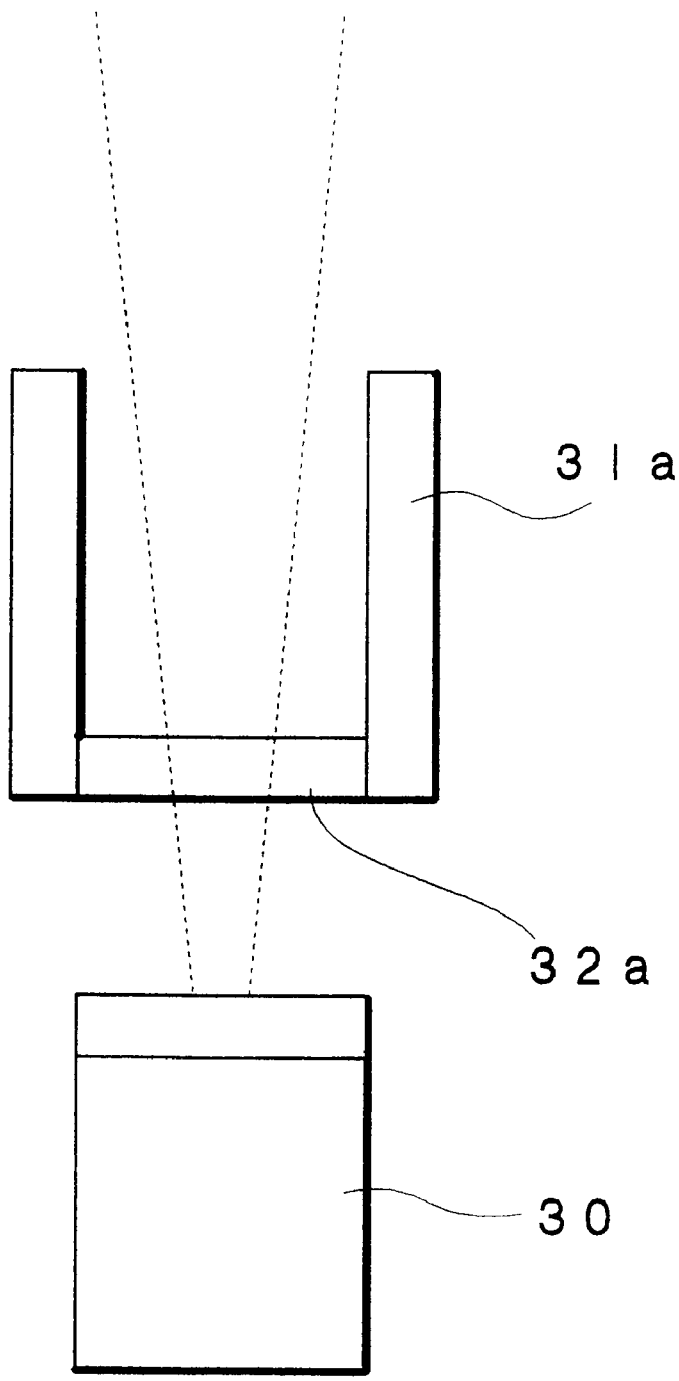
FIG. 3 is a schematic cross-sectional view taken along a line A—A in FIG. 2.

FIG. 3 is a schematic cross-sectional view taken along a line A—A in FIG. 2.

As shown in FIG. 3, the filter member 31a includes a filter 32a and the filter 32a is used for reading fluorescence by stimulating a fluorescent dye contained in the image carrier 22 using the first laser stimulating ray source 1 and has a property of cutting off light having a wavelength of 640 nm but transmitting light having a wavelength longer than 640 nm.

Figure 4:
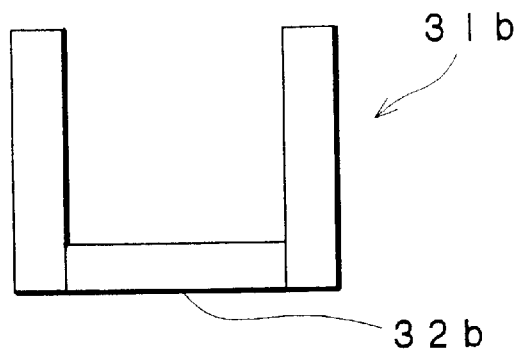
FIG. 4 is a schematic cross-sectional view taken along a line B—B in FIG. 2.

FIG. 4 is a schematic cross-sectional view taken along a line B—B in FIG. 2.

As shown in FIG. 4, the filter member 31b includes a filter 32b and the filter 32b is used for reading fluorescence by stimulating a fluorescent dye contained in the image carrier 22 using the second laser stimulating ray source 2 and has a property of cutting off light having a wavelength of 532 nm but transmitting light having a wavelength longer than 532 nm.

Figure 5:
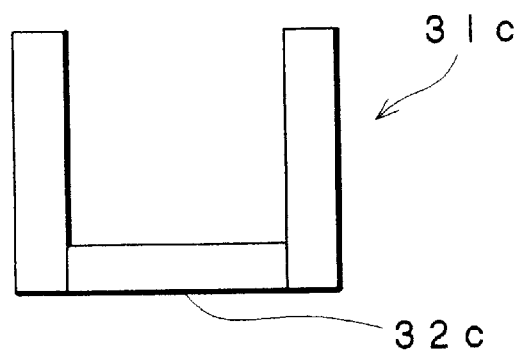
FIG. 5 is a schematic cross-sectional view taken along a line C—C in FIG. 2.

FIG. 5 is a schematic cross-sectional view taken along a line C—C in FIG. 2.

As shown in FIG. 5, the filter member 31c includes a filter 32c and the filter 32c is used for reading fluorescence by stimulating a fluorescent dye contained in the image carrier 22 using the third laser stimulating ray source 3 and has a property of cutting off light having a wavelength of 473 nm but transmitting light having a wavelength longer than 473 nm.

Figure 6:
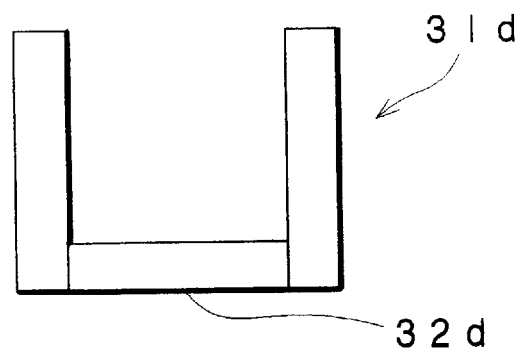
FIG. 6 is a schematic cross-sectional view taken along a line D—D in FIG. 2.

FIG. 6 is a schematic cross-sectional view taken along a line D—D in FIG. 2.

As shown in FIG. 6, the filter member 31d includes a filter 32d and the filter 32d is used in the case where the image carrier 21 is a stimulable phosphor sheet for reading stimulated emission released from stimulable phosphor contained in the stimulable phosphor sheet upon being stimulated using the first laser stimulating ray source 1 and has a property of transmitting only light having a wavelength corresponding to that of stimulated emission emitted from stimulable phosphor but cutting off light having a wavelength of 640 nm.

Therefore, in accordance with the kind of a stimulating ray source to be used, namely, depending upon whether the kind of the image carrier 22 or 21 and the kind of fluorescent substance, one of these filter members 31a, 31b, 31c, 31d is selectively positioned in front of the photomultiplier 30, thereby enabling the photomultiplier 30 to photoelectrically detect only light to be detected.

The analog data produced by photoelectrically detecting light by the photomultiplier 30 are converted by an A/D converter 33 into digital data and the digital data are fed to an image data processing apparatus 34.

Although not shown in FIG. 1, the optical head 15 is constituted to be movable by a scanning mechanism in the X direction and the Y direction in FIG. 1 so that the whole surface of the image carrier 22 is scanned by the laser beam 4.

Figure 7:
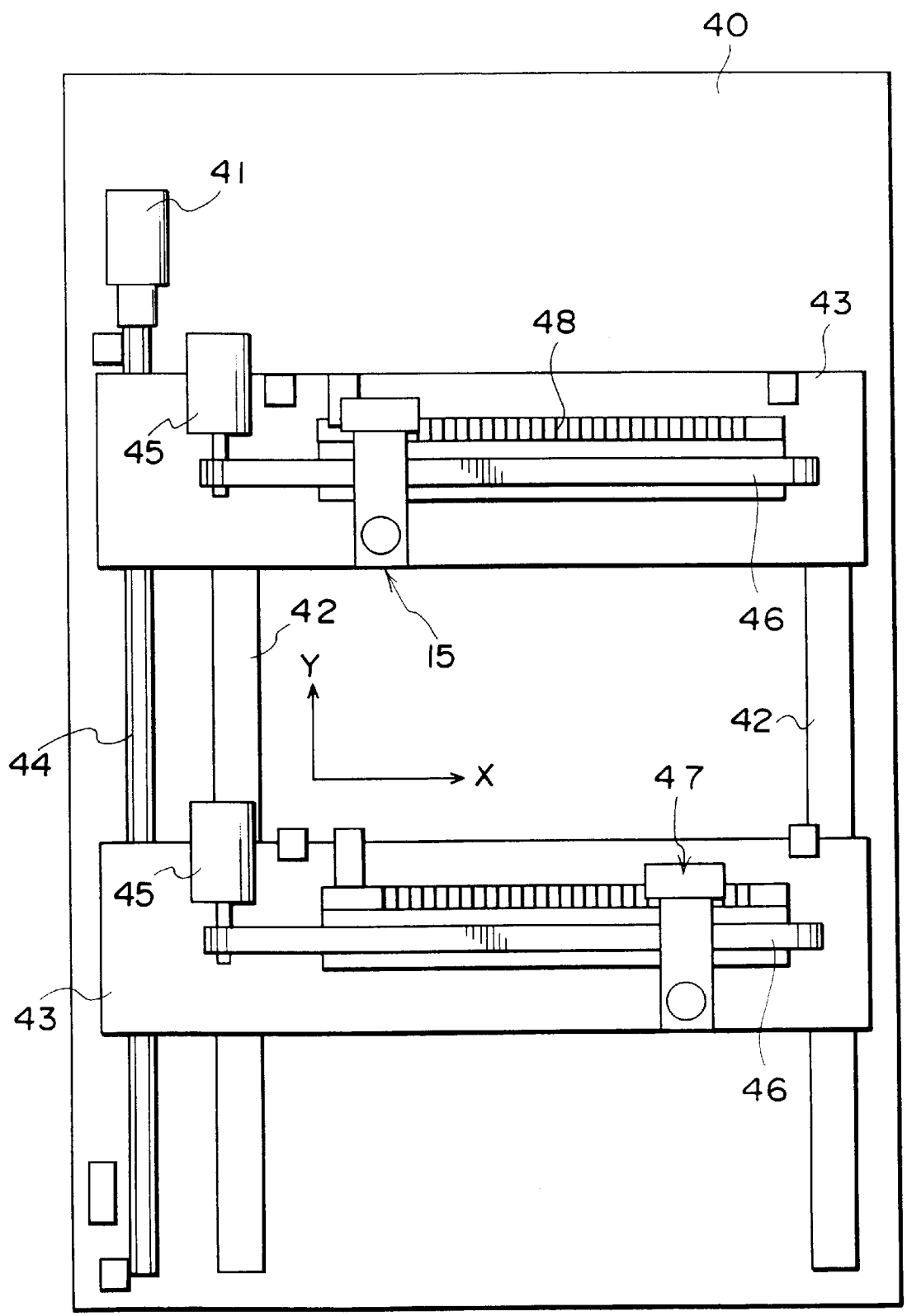
FIG. 7 is a schematic plan view of a scanning mechanism of an optical head.

FIG. 7 is a schematic plan view showing the scanning mechanism of the optical head 15. In FIG. 7, optical systems other than the optical head 15 and the paths of the laser beam 4 and fluorescence 25 or stimulated emission 25 are omitted for simplification.

As shown in FIG. 7, the scanning mechanism of the optical head 15 includes a base plate 40, and sub-scanning pulse motor 41 and a pair of rails 42, 42 are fixed on the base plate 40. A movable base plate 43 is further provided so as to be movable in the sub-scanning direction indicated by an arrow Y in FIG. 7.

The movable base plate 43 is formed with a threaded hole (not shown) and a threaded rod 44 rotated by the sub-scanning pulse motor 41 is engaged with the inside of the hole.

A main scanning pulse motor 45 is provided on the movable base plate 43. The main scanning pulse motor 45 is adapted for driving an endless belt 46. The optical head 15 is fixed to the endless belt 46 and when the endless belt 46 is driven by the main scanning pulse motor 45, the optical head 15 is moved in the main scanning direction indicated by an arrow X in FIG. 7. In FIG. 7, the reference numeral 47 designates a linear encoder for detecting the position of the optical head 15 in the main scanning direction and the reference numeral 48 designates slits of the linear encoder 47.

The optical head 15 is moved in the X direction and the Y direction in FIG. 7 by driving the endless belt 46 in the main scanning direction by the main scanning pulse motor 45 and moving the movable base plate 43 in the sub-scanning direction by the sub-scanning pulse motor 41, thereby scanning the whole surface of the image carrier 22 with the laser beam 4.

Figure 8:
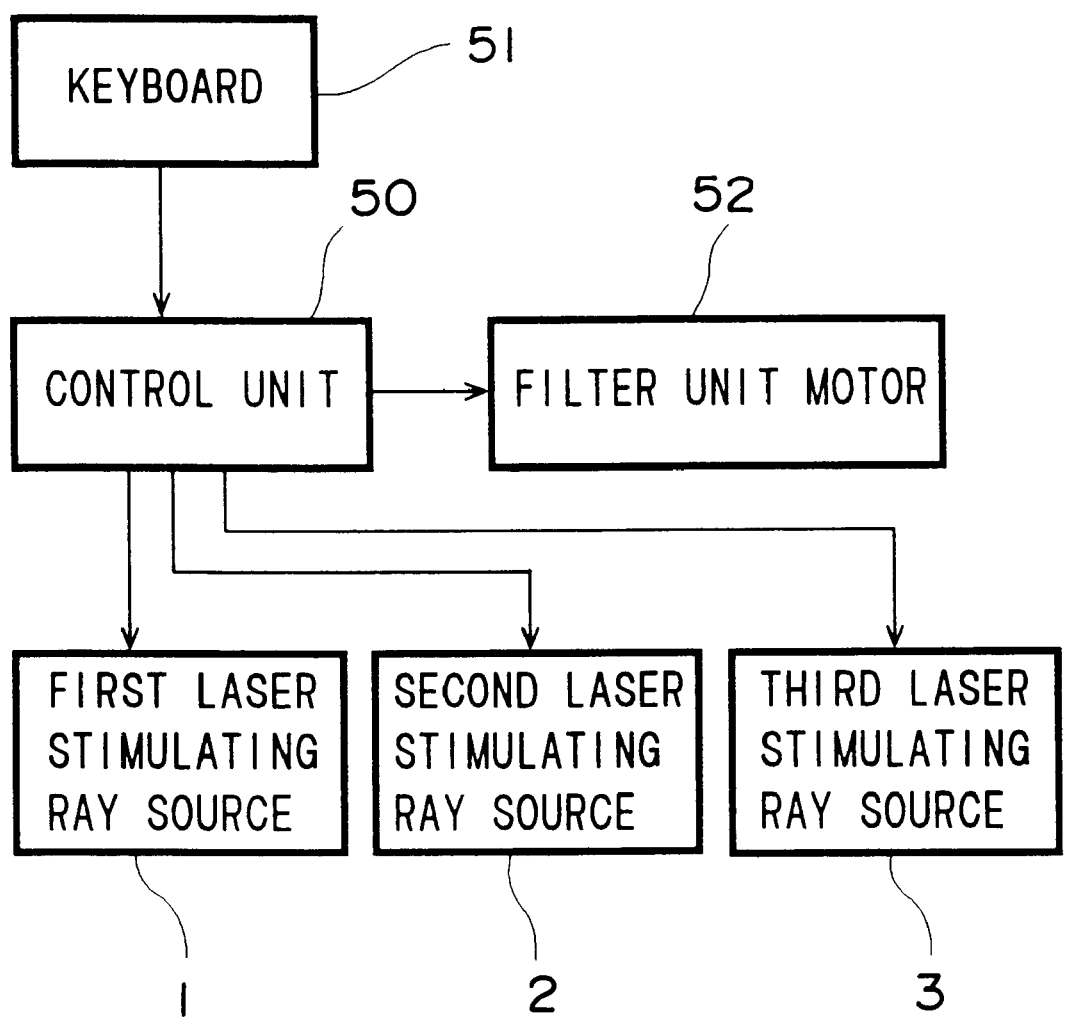
FIG. 8 is a block diagram of a control system, an input system and a drive system of an image reading apparatus which is a preferred embodiment of the present invention.

FIG. 8 is a block diagram of a control system, an input system and a drive system of the image reading apparatus which is a preferred embodiment of the present invention.

As shown in FIG. 8, the control system of the image reading apparatus includes a control unit 50 and the input system of the image reading apparatus includes a keyboard 51 which can be operated by an operator and through which various instruction signals can be input.

As shown in FIG. 8, the drive system of the image reading apparatus includes a filter unit motor 52 for moving the filter unit 28 provided with the four filter members 31a, 31b, 31c and 31d.

The control unit 50 is adapted for selectively outputting a drive signal to the first laser stimulating ray source 1, the second laser stimulating ray source 2 or the third laser stimulating ray source 3 and outputting a drive signal to the filter unit motor 52.

The thus constituted image reading apparatus according to this embodiment reads an autoradiographic image regarding locational information of a radioactive labeling substance recorded in a stimulable phosphor layer formed on a stimulable phosphor sheet, and produces digital image data in the following manner.

A stimulable phosphor sheet is first set on the glass plate of the stage 20 of the image reading apparatus as an image carrier.

An instruction signal indicating that an autoradiographic image regarding locational information of a radioactive labeling substance recorded in the stimulable phosphor layer formed on the stimulable phosphor sheet is to be read is then input through the keyboard 51.

The instruction signal input through the keyboard 51 is input to the control unit 50 and the control unit 50 outputs a drive signal to the filter unit motor 52 in accordance with the instruction signal, thereby moving the filter unit 28 so as to locate the filter member 31d provided with the filter 32d having a property of transmitting only light having a wavelength corresponding to that of stimulated emission emitted from stimulable phosphor but cutting off light having a wavelength of 640 nm.

The control unit 50 then outputs a drive signal to the first laser stimulating ray source 1 to activate it, thereby causing it to emit a laser beam 4 having a wavelength of 640 nm.

The laser beam 4 emitted from the first laser stimulating ray source 1 is made a parallel beam by the collimator lens 5 and enters the mirror 6 to be reflected thereby.

The laser beam 4 reflected by the mirror 6 passes through the first dichroic mirror 7 and the second dichroic mirror 8 and enters the mirror 6.

The laser beam 4 entering the mirror 9 is reflected by the mirror 9 and further enters a mirror 12 to be reflected thereby. The laser beam 4 reflected by the mirror 12 passes through the hole 13 of the perforated mirror 14 and advances to the concave mirror 18.

The laser beam 4 advancing to the concave mirror 18 is reflected thereby and enters the optical head 15.

The laser beam 4 entering the optical head 15 is reflected by the mirror 16 and condensed by the aspherical lens 17 onto the stimulable phosphor layer formed on the stimulable phosphor sheet placed on the glass plate 21 of the stage 20.

As a result, a stimulable phosphor contained in the stimulable phosphor layer formed on the stimulable phosphor sheet is stimulated by the laser beam 4 and stimulated emission 25 is released from the stimulable phosphor.

The stimulated emission 25 released from the stimulable phosphor is condensed by the aspherical lens 17 provided in the optical head 15 and reflected by the mirror 16 on the side of an optical path of the laser beam 4, thereby being made a parallel beam to advance to the concave mirror 18.

The stimulated emission 25 advancing to the concave mirror 18 is reflected by the concave mirror 18 and advances to the perforated mirror 14.

As shown in FIG. 2, the stimulated emission 25 advancing to the perforated mirror 14 is reflected downward by the perforated mirror 14 formed by a concave mirror and advances to the filter 32d of a filter unit 28.

Since the filter 32d has a property of transmitting only light having a wavelength corresponding to that of stimulated emission emitted from stimulable phosphor but cutting off light having a wavelength of 640 nm, light having a wavelength of 640 nm corresponding to that of the stimulating ray is cut off by the filter 32d and only light having a wavelength corresponding to that of stimulated emission passes through the filter 32d to be photoelectrically detected by the photomultiplier 30.

As described above, since the optical head 15 is moved on the base plate 43 in the X direction in FIGS. 1 and 7 by the main scanning pulse motor 45 mounted on the base plate 43 and the base plate 43 is moved in the Y direction in FIGS. 1 and 7 by the sub-scanning pulse motor 41, the whole surface of the stimulable phosphor layer formed on the stimulable phosphor sheet is scanned by the laser beam 4. Therefore, the photomultiplier 30 can read an autoradiographic image regarding locational information of a radioactive labeling substance recorded in the stimulable phosphor layer by photoelectrically detecting the stimulated emission 25 and produce analog image data.

The analog image data produced by photoelectrically detecting the stimulated emission 25 are converted by the A/D converter 33 into digital image data and the digital data are fed to the image data processing apparatus 34.

On the other hand, when a fluorescent image carried in a transfer support or a gel support is to be read, the transfer support or the gel support is set on the glass plate 21 of the stage 20.

The kind of fluorescent substance labeling the specimen is then input through the keyboard 51 by an operator and an instruction signal indicating that a fluorescent image is to be read are input through the keyboard 51.

The instruction signal and the kind of a fluorescent substance labeling the specimen input through the keyboard 51 are input to the control unit 50 and when the control unit 50 receives them, it determines the laser stimulating ray source to be used in accordance with a table stored in a memory (not shown) and also determines what filter is to be positioned in the optical path of fluorescence 25 among the filters 32a, 32b and 32c.

When the specimen is labeled with Rhodamine (registered trademark), which can be efficiently stimulated by a laser beam having a wavelength of 532 nm, the control unit 50 selects the second laser stimulating ray source 2 and the filter 32b and outputs a drive signal to the filter unit motor 52, thereby moving the filter unit 28 so that the filter member 31b including the filter 32b having a property of cutting off light having a wavelength of 532 nm but transmitting light having a wavelength longer than 532 nm in the optical path of the fluorescence 25.

The control unit 50 then outputs a drive signal to the second laser stimulating ray source 2 to activate it, thereby causing it to emit a laser beam having a wavelength of 532 nm.

The laser beam 4 emitted from the second laser stimulating ray source 2 is made a parallel beam by the collimator lens 10, enters the first dichroic mirror 7 and is reflected thereby.

The laser beam 4 reflected by the first dichroic mirror 7 transmits through the second dichroic mirror 8 and enters the mirror 9.

The laser beam 4 entering the mirror 9 is reflected by the mirror 9 and further enters a mirror 12 to be reflected thereby. The laser beam 4 reflected by the mirror 12 advances to the perforated mirror 14 and passes through the hole 13 of the perforated mirror 14. Then, the laser beam 4 advances to the concave mirror 18.

The laser beam 4 advancing to the concave mirror 18 is reflected thereby and enters the optical head 15.

The laser beam 4 entering the optical head 15 is reflected by the mirror 16 and condensed by the aspherical lens 17 onto the transfer support or the gel support placed on the glass plate 21 of the stage 20.

As a result, Rhodamine contained in the transfer support or the gel support as a fluorescent substance is stimulated by the laser beam 4 and fluorescence 25 is released from Rhodamine.

The fluorescence 25 released from Rhodamine is condensed by the aspherical lens 17 provided in the optical head 15 and reflected by the mirror 16 on the side of an optical path of the laser beam 4, thereby being made a parallel beam to advance to the concave mirror 18.

The fluorescence 25 advancing to the concave mirror 18 is reflected by the concave mirror 18 and advances to the perforated mirror 14.

As shown in FIG. 2, the fluorescence 25 advancing to the perforated mirror 14 is reflected downward by the perforated mirror 14 formed by a concave mirror and advances to the filter 32b of a filter unit 28.

Since the filter 32b has a property of cutting off light having a wavelength of 532 nm but transmitting light having a wavelength longer than 532 nm, light having the same wavelength of 532 nm as that of the stimulating ray is cut off by the filter 32b and only light in the wavelength of the fluorescence 25 released from Rhodamine passes through the filter 32b to be photoelectrically detected by the photomultiplier 30.

As described above, since the optical head 15 is moved on the base plate 43 in the X direction in FIGS. 1 and 7 by the main scanning pulse motor 45 mounted on the base plate 43 and the base plate 43 is moved in the Y direction in FIGS. 1 and 7 by the sub-scanning pulse motor 41, the whole surface of the transfer support or the gel support is scanned by the laser beam 4. Therefore, the photomultiplier 30 can read a fluorescent image of Rhodamine as a fluorescent substance recorded in the transfer support or the gel support photoelectrically detecting the fluorescence 25 released from Rhodamine contained in the transfer support or the gel support and labeling the specimen and produce analog image data.

The analog image data produced by photoelectrically detecting the stimulated emission 25 are converted by the A/D converter 33 into digital image data and the digital data are fed to the image data processing apparatus 34.

According to the above described embodiment, a laser beam 4 passing through the hole 13 formed at the center portion of the perforated mirror 14, reflected by the concave mirror 18 and entering the optical head 15 is reflected by the mirror 16 provided in the optical head 15 and condensed by the aspherical lens 17 onto the image carrier 22, while stimulated emission 25 or fluorescence 25 released from the image carrier 22 is condensed by the aspherical lens 17 provided in the optical head 15, is reflected by the mirror 16 on the side of the optical path of the laser beam 4 to be made a parallel beam, advances to the concave mirror 18 to be reflected thereby, advances to the perforated mirror 14 to be reflected thereby and is led to the photomultiplier 30 to be photoelectrically detected thereby. Therefore, since the optical head 15 is provided with merely the mirror 16 and the aspherical lens 17 and the weight thereof is light, it is possible to move the optical head 15 at a high speed in FIGS. 1 and 7 so as to scan the image carrier 22 thereby at a high speed and read an image carried in the image carrier 22 at a high speed.

Further, according to the above described embodiment, a laser beam 4 passes through the hole 13 formed at the center portion of the perforated mirror 14 and is reflected by the concave mirror 18 and enters the optical head 15 and is reflected by the mirror 16 provided in the optical head 15 and condensed by the aspherical lens 17 onto the image carrier 22, while stimulated emission 25 or fluorescence 25 released from the image carrier 22 is condensed by the aspherical lens 17 provided in the optical head 15, is reflected by the mirror 16 on the side of the optical path of the laser beam 4, is further reflected by the concave mirror 18, is led to the perforated mirror 14 and is reflected by the perforated mirror 14 toward the photomultiplier 30. This makes it unnecessary to employ a beam splitter such as a dichroic mirror in order to lead stimulated emission 25 or fluorescence 25 in a direction different from the optical path of a laser beam 4. When a different laser stimulating ray source is used, therefore, there is no need to interchange a beam splitter such as a dichroic mirror. As a consequence, the operation can be simplified and since a plurality of beam splitters, such as dichroic mirrors, for different kinds of laser beams to be used need not be kept on hand, the cost can be reduced.

Figure 9:
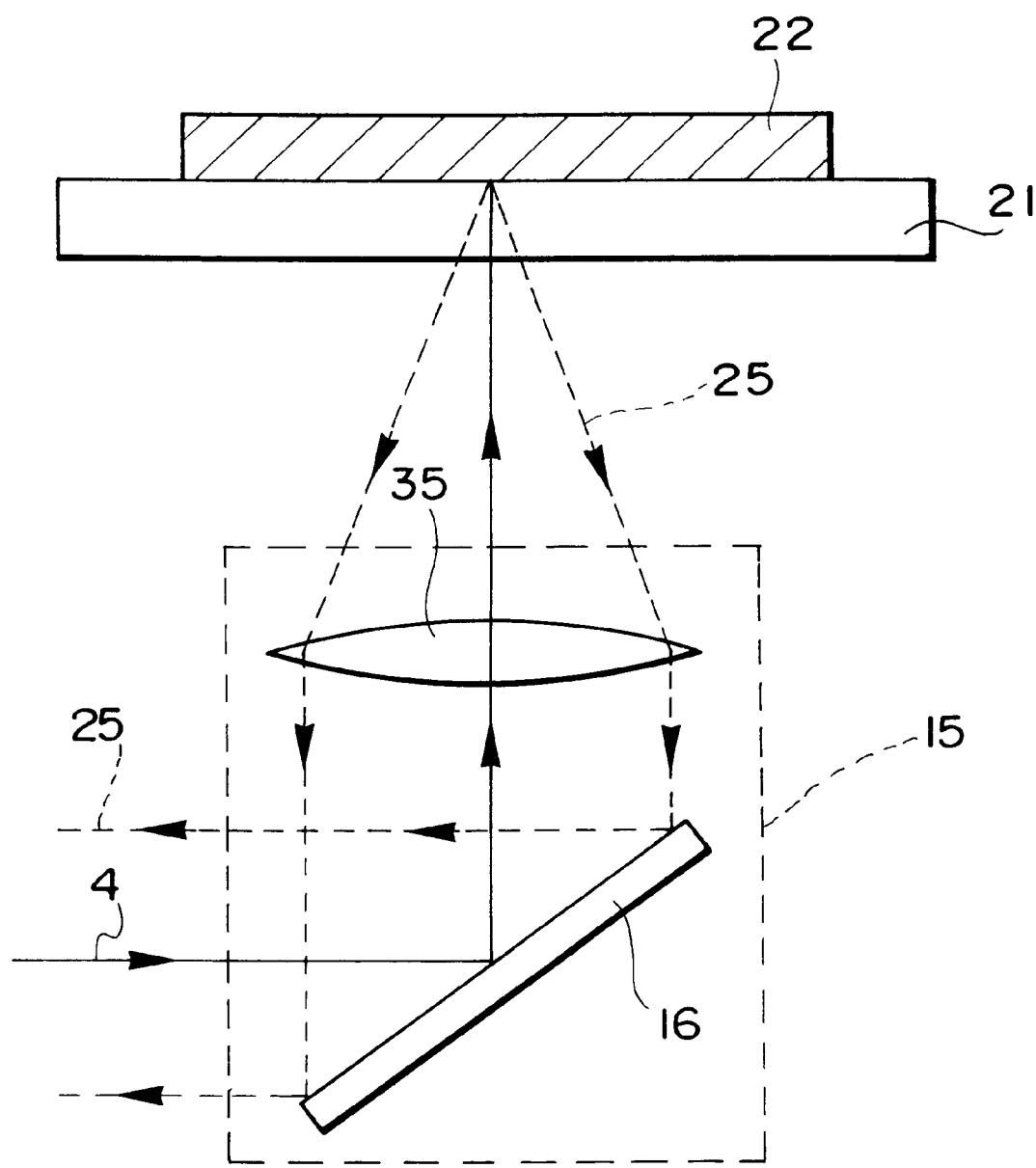
FIG. 9 is a schematic cross-sectional view showing an optical head used in an image reading apparatus which is another preferred embodiment of the present invention.

FIG. 9 is a schematic cross-sectional view showing an optical head 15 used in an image reading apparatus which is another preferred embodiment of the present invention.

As shown in FIG. 9, an optical head 15 used in the image reading apparatus according to this embodiment includes a mirror 16 and a convex lens 35.

The mirror 16 serves to reflect a laser beam 4 emitted from the first laser stimulating ray source 1, the second laser stimulating ray source 2 or the third laser stimulating ray source 3, reflected by the mirror 9 and the mirror 12, passing through the hole 13 of the perforated mirror 14, reflected by the concave mirror 18 and entering the optical head 15 toward the image carrier 22, and to reflect fluorescence 25 or stimulated emission 25 released from the image carrier 22 and made a parallel beam by the convex lens 35 toward the concave mirror 18. The convex lens 35 serves to condense the laser beam 4 reflected by the mirror 16 onto the image carrier 22 and make fluorescence 25 or stimulated emission 25 released from the image carrier 22 in response to the irradiation by the laser beam 4 a parallel beam.

The thus constituted optical head 15 condenses an incident laser beam 4 onto the image carrier 22 and reflects fluorescence 25 or stimulated emission 25 released from the image carrier 22 in response to the irradiation by the laser beam 4 toward the concave mirror 18 so as to make it a parallel beam in the following manner.

A laser beam 4 entering the optical head 15 advances to the mirror 16 and is reflected by the mirror 16 toward the image carrier 22 to enter the convex lens 35. The laser beam 4 entering the convex lens 35 is condensed by the convex lens 35 onto the image carrier 22 and a fluorescent substance or a stimulable phosphor contained in the image carrier 22 is excited, thereby releasing fluorescence 25 or stimulated emission 25.

The fluorescence 25 or the stimulated emission 25 released from a fluorescent substance or a stimulable phosphor upon being stimulated passes through the convex lens 35, thereby being made a parallel beam and advances to the mirror 16 to be reflected thereby toward the concave mirror 18.

According to this embodiment, since the optical head 15 is provided with only the mirror 16 and the convex lens 35, the weight thereof is lighter than a conventional optical head provided with a reflection mirror, a perforated mirror and a convex lens and, therefore, it is possible to scan the image carrier 22 by the laser beam 4 at a high speed by moving the optical head 15 at a high speed in FIGS. 1 and 7 and read an image carried in the image carrier 22 at a high speed.

Figure 10:
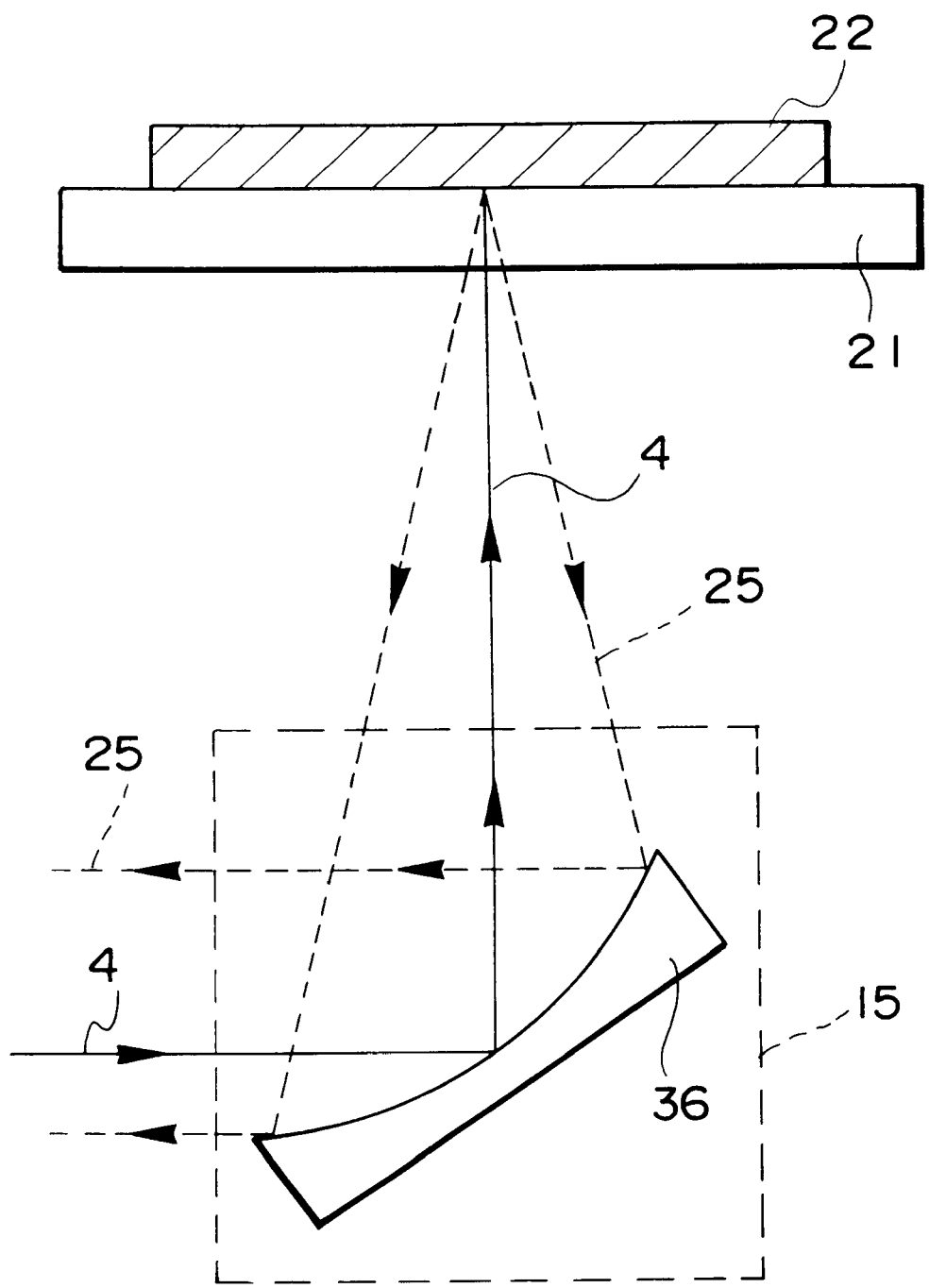
FIG. 10 is a schematic cross-sectional view showing an optical head used in an image reading apparatus which is a further preferred embodiment of the present invention.

FIG. 10 is a schematic cross-sectional view showing an optical head 15 used in an image reading apparatus which is a further preferred embodiment of the present invention.

As shown in FIG. 10, an optical head 15 used in the image reading apparatus according to this embodiment includes a concave mirror 36.

The concave mirror 36 serves to reflect a laser beam 4 emitted from the first laser stimulating ray source 1, the second laser stimulating ray source 2 or the third laser stimulating ray source 3, reflected by the mirror 9 and the mirror 12, passing through the hole 13 of the perforated mirror 14, reflected by the concave mirror 18 and entering the optical head 15 toward the image carrier 22, thereby condensing the laser beam 4 onto the image carrier 22, and to reflect fluorescence 25 or stimulated emission 25 released from the image carrier 22 upon being irradiated by the laser beam 4 toward the concave mirror 18 as a parallel beam.

The thus constituted optical head 15 condenses an incident laser beam 4 onto the image carrier 22 and reflects fluorescence 25 or stimulated emission 25 released from the image carrier 22 in response to the irradiation by the laser beam 4 toward the concave mirror 18 so as to make it a parallel beam in the following manner.

A laser beam 4 entering the optical head 15 advances to the concave mirror 36 and is reflected by the concave mirror 36 toward the image carrier 22 to be condensed onto the image carrier 22. As a result, a fluorescent substance or a stimulable phosphor contained in the image carrier 22 is excited by the laser beam 4, thereby releasing fluorescence 25 or stimulated emission 25.

The fluorescence 25 or the stimulated emission 25 released from a fluorescent substance or a stimulable phosphor upon being stimulated enters the concave mirror 36 to be made a parallel beam and is reflected by the concave mirror 36 toward the image carrier 22.

According to this embodiment, since the optical head 15 is provided with only the concave mirror 36, the weight thereof is lighter than a conventional optical head provided with a reflection mirror, a perforated mirror and a convex lens and, therefore, it is possible to scan the image carrier 22 by the laser beam 4 at a high speed by moving the optical head 15 at a high speed in FIGS. 1 and 7 and read an image carried in the image carrier 22 at a high speed.

Figure 11:
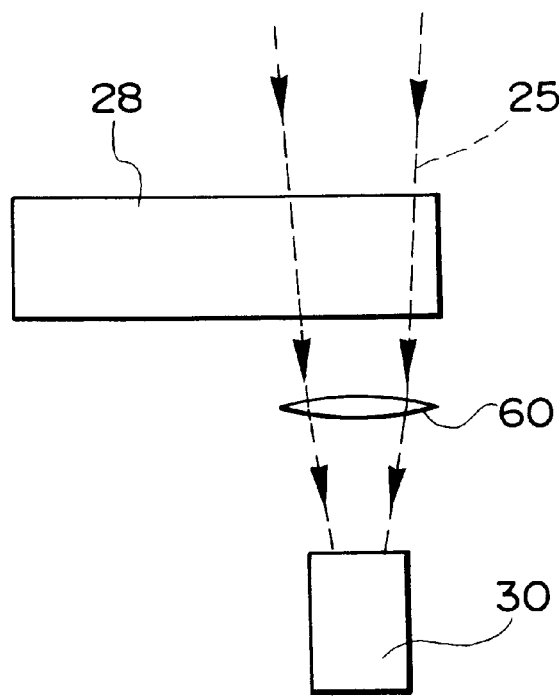
FIG. 11 is a schematic perspective view showing details in the vicinity of a photomultiplier in an image reading apparatus which is a further preferred embodiment of the present invention.

FIG. 11 is a schematic cross-sectional view showing the optical head used in an image reading apparatus which is a further preferred embodiment of the present invention.

As shown in FIG. 11, in the image reading apparatus according to this embodiment, a convex lens 60 is provided between the photomultiplier 30 and the filter unit 28.

In the case of a fluorescent sample using a transfer support or a gel support, particularly an agarose gel support, as a carrier, a fluorescent substance is distributed in the depth direction of the support and light releasing points are distributed in the depth direction of the support when the fluorescent substance is stimulated. Therefore, when it is attempted to use the concave mirror 18 and the perforated mirror 14 to condense fluorescence, the beam of fluorescence diverges. In this case, although fluorescence 25 released from a fluorescent substance located in the vicinity of the transfer support or the gel support can be detected by the photomultiplier 30, fluorescence released from the deep portions of the transfer support or the gel support does not impinge on the photomultiplier 30 and therefore cannot be detected by the photomultiplier 30. The read sensitivity of the fluorescent image is therefore degraded.

Therefore, the image reading apparatus according to this embodiment is constituted by providing the convex lens 60 between the photomultiplier 30 and the filter unit 28 so that the beam of fluorescence 25 diverged because the fluorescent substance is distributed in the depth direction of the support and light releasing points are distributed in the depth direction of the support when the fluorescent substance is stimulated can be condensed by the convex lens 60 onto the photoelectrical detecting surface of the photomultiplier 30 and is detected by the photomultiplier 30.

On the other hand, since stimulated emission 25 is released from a portion in the vicinity of the surface of a stimulable phosphor layer formed on a stimulable phosphor sheet, the stimulated emission 25 can be condensed onto the photoelectrical detecting surface of the photomultiplier 30 without providing the convex lens 60. The provision of the convex lens 60 between the photomultiplier 30 and the filter unit 28 may have the undesirable effect of causing the beam of the stimulated emission 25 to diverge. Therefore, the diameter, curvature, position and the like of the convex lens 60 are selected so that all beams of fluorescence 25 released from a fluorescent sample using a transfer support or a gel support, particularly an agarose gel support, as a carrier can be condensed onto the photoelectrical detecting surface of the photomultiplier 30 and detected by the photomultiplier 30 and that all beams of stimulated emission 25 released from a stimulable phosphor layer formed on a stimulable phosphor sheet can be condensed onto the photoelectrical detecting surface of the photomultiplier 30 and detected by the photomultiplier 30.

According to this embodiment, fluorescence 25 released from a fluorescent sample using a transfer support or a gel support, particularly, an agarose gel support as a carrier can be efficiently condensed by the convex lens 60 onto the photoelectrical detecting surface of the photomultiplier 30 and detected by the photomultiplier 30. Therefore, it is possible to read a fluorescent image with high sensitivity.

Figure 12:
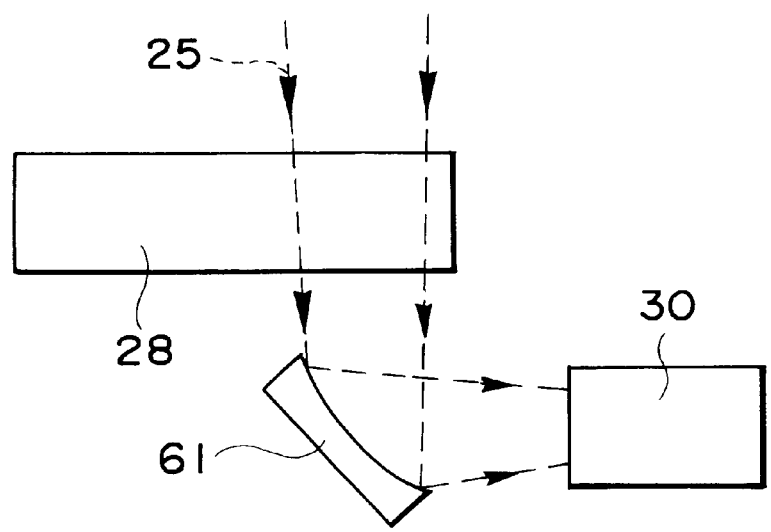
FIG. 12 is a schematic perspective view showing details in the vicinity of a photomultiplier in an image reading apparatus which is a further preferred embodiment of the present invention.

FIG. 12 is a schematic cross-sectional view showing the optical head used in an image reading apparatus which is a further preferred embodiment of the present invention.

As shown in FIG. 12, in the image reading apparatus according to this embodiment, a concave mirror 61 is provided in the optical path of fluorescence 25 or stimulated emission 25 passing through the filter unit 28.

Therefore, the image reading apparatus according to this embodiment is constituted so that the beam of fluorescence 25 diverged because a fluorescent substance is distributed in the depth direction of the support and light releasing points are distributed in the depth direction of the support when the fluorescent substance is stimulated can be condensed by the concave mirror 61 onto the photoelectrical detecting surface of the photomultiplier 30 and is detected by the photomultiplier 30.

In this embodiment, the diameter, curvature, position and the like of the concave mirror 61 are selected so that all beams of fluorescence 25 released from a fluorescent sample using a transfer support or a gel support, particularly an agarose gel support, as a carrier can be condensed onto the photoelectrical detecting surface of the photomultiplier 30 and detected by the photomultiplier 30 and that all beams of stimulated emission 25 released from a stimulable phosphor layer formed on a stimulable phosphor sheet can be condensed onto the photoelectrical detecting surface of the photomultiplier 30 and detected by the photomultiplier 30.

According to this embodiment, fluorescence 25 released from a fluorescent sample using a transfer support or a gel support, particularly an agarose gel support, as a carrier can be efficiently condensed by the concave mirror 61 onto the photoelectrical detecting surface of the photomultiplier 30 and detected by the photomultiplier 30. Therefore, it is possible to read a fluorescent image with high sensitivity.

Figure 13:
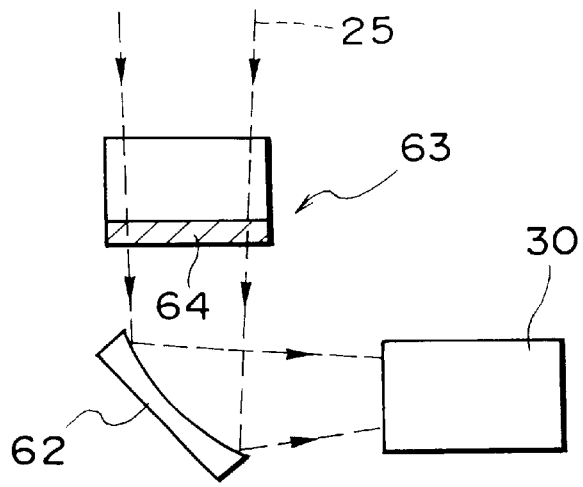
FIG. 13 is a schematic perspective view showing details in the vicinity of a photomultiplier in an image reading apparatus which is a further preferred embodiment of the present invention.

FIG. 13 is a schematic perspective view showing details in the vicinity of a photomultiplier in an image reading apparatus which is a further preferred embodiment of the present invention.

As shown in FIG. 13, in the image reading apparatus according to this embodiment, a concave mirror 62 is provided in the optical path of fluorescence 25 or stimulated emission 25 reflected by the perforated mirror 14 and a filter module 63 exchangeable by the user is provided between the perforated mirror 14 and the concave mirror 62 instead of the filter unit 28 provided with four filter members 31a, 31b, 31c, 31d.

As shown in FIG. 13, the filter module 63 is provided with a filter 64 having a predetermined light transmittance property.

More specifically, in this embodiment, when a fluorescent substance contained in the image carrier 22 is stimulated using the first laser stimulating ray source 1 and fluorescence is detected, the user sets a filter module 63 provided with a filter 64 having a property of cutting off light having a wavelength of 640 nm but transmitting light having a wavelength longer than 640 nm between the perforated mirror 14 and the concave mirror 62. When a fluorescent substance contained in the image carrier 22 is stimulated using the second laser stimulating ray source 2 and fluorescence is detected, the user sets a filter module 63 provided with a filter 64 having a property of cutting off light having a wavelength of 532 nm but transmitting light having a wavelength longer than 532 nm between the perforated mirror 14 and the concave mirror 62. When a fluorescent substance contained in the image carrier 22 is stimulated using the third laser stimulating ray source 3 and fluorescence is detected, the user sets a filter module 63 provided with a filter 64 having a property of cutting off light having a wavelength of 473 nm but transmitting light having a wavelength longer than 473 nm between the perforated mirror 14 and the concave mirror 62.

On the other hand, when a stimulable phosphor contained in a stimulable phosphor sheet is stimulated using the first laser stimulating ray source 1 and stimulated emission is detected, the user sets a filter module 63 provided with a filter 64 having a property of transmitting only light having a wavelength corresponding to that of stimulated emission emitted from stimulable phosphor but cutting off light having a wavelength of 640 nm between the perforated mirror 14 and the concave mirror 62.

In this embodiment, the image reading apparatus is constituted so that the beam of fluorescence 25 diverged because a fluorescent substance is distributed in the depth direction of the support and light releasing points are distributed in the depth direction of the support when the fluorescent substance is stimulated can be condensed by the concave mirror 62 onto the photoelectrical detecting surface of the photomultiplier 30 and is detected by the photomultiplier 30. The diameter, curvature, position and the like of the concave mirror 62 are selected so that all beams of fluorescence 25 released from a fluorescent sample using a transfer support or a gel support, particularly an agarose gel support, as a carrier can be condensed onto the photoelectrical detecting surface of the photomultiplier 30 and detected by the photomultiplier 30 and that all beams of stimulated emission 25 released from a stimulable phosphor layer formed on a stimulable phosphor sheet can be condensed onto the photoelectrical detecting surface of the photomultiplier 30 and detected by the photomultiplier 30.

According to this embodiment, fluorescence 25 released from a fluorescent sample using a transfer support or a gel support, particularly an agarose gel support, as a carrier can be efficiently condensed by the concave mirror 62 onto the photoelectrical detecting surface of the photomultiplier 30 and detected by the photomultiplier 30. Therefore, it is possible to read a fluorescent image with high sensitivity.

Figure 14:
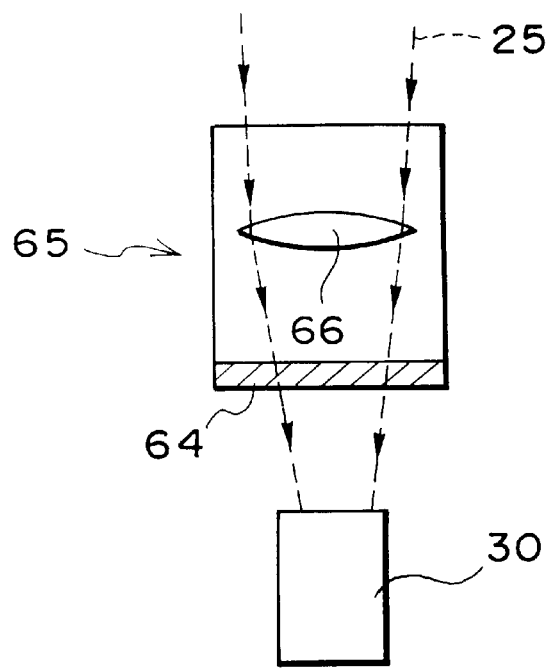
FIG. 14 is a schematic perspective view showing details in the vicinity of a photomultiplier in an image reading apparatus which is a further preferred embodiment of the present invention.

FIG. 14 is a schematic perspective view showing details in the vicinity of a photomultiplier in an image reading apparatus which is a further preferred embodiment of the present invention.

As shown in FIG. 14, in the image reading apparatus according to this embodiment, a filter module 65 is provided between the perforated mirror 14 and the photomultiplier 30 so as to be exchangeable by the user.

As shown in FIG. 14, the filter module 65 is provided with a filter 64 having a predetermined light transmittance property and a convex lens 66.

More specifically, in this embodiment, when a fluorescent substance contained in the image carrier 22 is stimulated using the first laser stimulating ray source 1 and fluorescence is detected, the user sets a filter module 65 provided with a filter 64 having a property of cutting off light having a wavelength of 640 nm but transmitting light having a wavelength longer than 640 nm between the perforated mirror 14 and the photomultiplier 30. When a fluorescent substance contained in the image carrier 22 is stimulated using the second laser stimulating ray source 2 and fluorescence is detected, the user sets a filter module 65 provided with a filter 64 having a property of cutting off light having a wavelength of 532 nm but transmitting light having a wavelength longer than 532 nm between the perforated mirror 14 and the photomultiplier 30. When a fluorescent substance contained in the image carrier 22 is stimulated using the third laser stimulating ray source 3 and fluorescence is detected, the user sets a filter module 65 provided with a filter 64 having a property of cutting off light having a wavelength of 473 nm but transmitting light having a wavelength longer than 473 nm between the perforated mirror 14 and the photomultiplier 30.

According to this embodiment, since the filter module 65 provided with the filter 64 having a predetermined light transmittance property and the convex lens 66 is selected by a user in accordance with the wavelength of the laser beam 4 to be used for exciting a fluorescent substance and is set between the perforated mirror 14 and the photomultiplier 30, all beams of fluorescence 25 released from a fluorescent sample using a transfer support or a gel support, particularly an agarose gel support, as a carrier can be condensed by the convex lens 66 onto the photoelectrical detecting surface of the photomultiplier 30 and detected by the photomultiplier 30.

On the other hand, when a stimulable phosphor contained in a stimulable phosphor sheet is stimulated using the first laser stimulating ray source 1 and stimulated emission 25 is detected, since stimulated emission 25 is released from a portion in the vicinity of the surface of a stimulable phosphor layer formed on the stimulable phosphor sheet, the stimulated emission 25 can be condensed onto the photoelectrical detecting surface of the photomultiplier 30 without using the convex lens 66. Condensing the stimulated emission 25 by the convex lens 66 is actually undesirable because it would cause the beam of the stimulated emission 25 to diverge. Therefore, in this case, as shown in FIG. 13, the user sets the filter module 63 provided with no convex lens 66 but with the filter 64 having a property of transmitting only light having a wavelength corresponding to that of stimulated emission emitted from stimulable phosphor but cutting off light having a wavelength of 640 nm between the perforated mirror 14 and the photomultiplier 30.

According to this embodiment, when a fluorescent image carried in a transfer support or a gel support is to be read, since the filter module 65 provided with the filter 64 having a predetermined light transmittance property and the convex lens 66 is selected by the user in accordance with the wavelength of a laser beam 4 to be used for exciting a fluorescent substance and is set between the perforated mirror 14 and the photomultiplier 30, all beams of fluorescence 25 released from a fluorescent sample using a transfer support or a gel support, particularly an agarose gel support, as a carrier can be condensed by the convex lens 66 onto the photoelectrical detecting surface of the photomultiplier 30 and detected by the photomultiplier 30. On the other hand, when a stimulable phosphor contained in a stimulable phosphor sheet is stimulated using the first laser stimulating ray source 1 and stimulated emission 25 released from a portion in the vicinity of the surface of a stimulable phosphor layer formed on the stimulable phosphor sheet is detected, the stimulated emission 25 can be condensed onto the photoelectrical detecting surface of the photomultiplier 30 without using the convex lens 66. Condensing the stimulated emission 25 by the convex lens 66 is actually undesirable because it would cause the beam of the stimulated emission 25 to diverge. Therefore, the user sets a filter module 63 provided with a filter 64 that has a property of transmitting only light having a wavelength corresponding to that of stimulated emission emitted from stimulable phosphor but cutting off light having a wavelength of 640 nm and is not equipped with the convex lens 66 between the perforated mirror 14 and the photomultiplier 30. As a result, it is possible to read an autoradiographic image regarding locational information of a radioactive labeling substance with high sensitivity.

Figure 15:
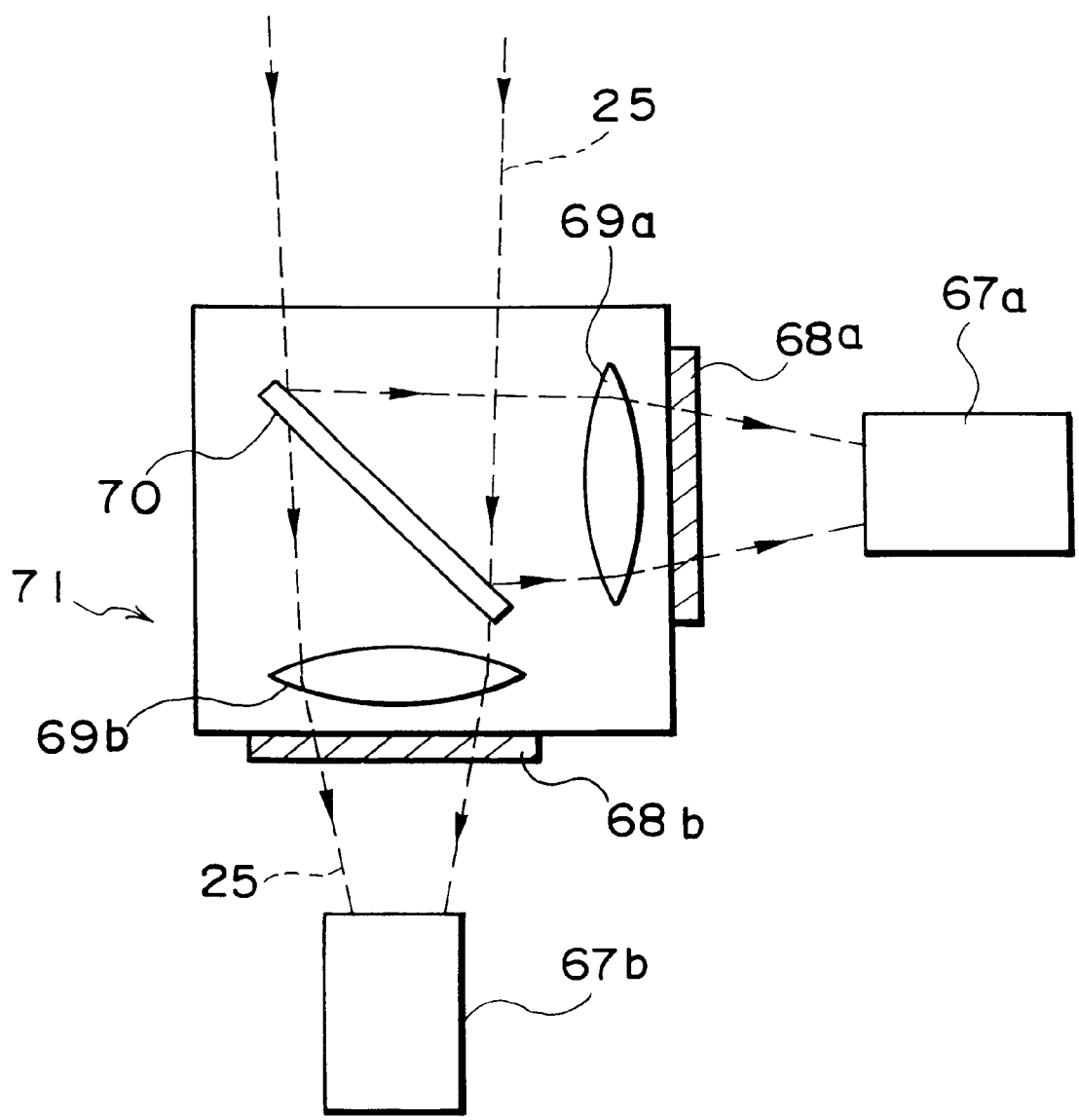
FIG. 15 is a schematic perspective view showing details in the vicinity of a photomultiplier in an image reading apparatus which is a further preferred embodiment of the present invention.

FIG. 15 is a schematic perspective view showing details in the vicinity of a photomultiplier in an image reading apparatus which is a further preferred embodiment of the present invention.

As shown in FIG. 15, the image reading apparatus according to this embodiment is provided with a first photomultiplier 67a and a second photomultiplier 67b whose photoelectrical detecting surfaces are perpendicular. A filter module 71, which includes a first filter 68a and a second filter 68b whose light transmittance properties are different, a first convex lens 69a, and a second convex lens 69b and a dichroic mirror 70, is provided between the perforated mirror 14 and the first and second photomultipliers 67a and 67b. In this embodiment, the filter module 71 is constituted to be exchangeable by the user.

In this embodiment, the image reading apparatus is constituted so as to simultaneously irradiate an image carrier 22 carrying a fluorescent image of a specimen selectively labeled with two kinds of fluorescent substances with laser beams 4 emitted from two laser stimulating ray sources, thereby exciting the two kinds of fluorescent substances capable of being efficiently excited by different wavelengths of light by two laser beams whose wavelengths are different and simultaneously detect fluorescence released from the two kinds of fluorescent substances by the first photomultiplier 67a and the second photomultiplier 67b.

In the case where a specimen contained in the image carrier 22 is selectively labeled with a fluorescent substance which can be efficiently stimulated by a laser beam 4 of a wavelength of 640 nm and a fluorescent substance which can be efficiently stimulated by a laser beam 4 of a wavelength of 532 nm, a filter module 71 provided with a first filter 68a having a property of cutting off light having a wavelength of 640 nm but transmitting light having a wavelength longer than 640 nm, a second filter 68b having a property of cutting off light having a wavelength of 532 nm but transmitting light having a wavelength longer than 532 nm, a dichroic mirror 70 having a property of reflecting light having a wavelength equal to or longer than 640 nm and transmitting light having a wavelength shorter than 640 nm is selected by the user and is set between the perforated mirror 14 and the first and second photomultipliers 67a and 67b.

As a result, since the wavelength of fluorescence released from a fluorescent substance upon being stimulated is longer than the wavelength of the stimulating ray, fluorescence released from a fluorescent substance labeling the specimen upon being stimulated by the laser beam 4 having a wavelength of 640 nm and advancing to the dichroic mirror 70 is reflected by the dichroic mirror 70 and enters the first filter 68a. On the other hand, fluorescence released from a fluorescent substance labeling the specimen upon being stimulated by the laser beam 4 having a wavelength of 532 nm and advancing to the dichroic mirror 70 transmits through the dichroic mirror 70 and enters the second filter 68b.

Since the first filter 68a has a property of cutting off light having a wavelength of 640 nm but transmitting light having a wavelength longer than 640 nm, light having a wavelength of 640 nm equal to that of the stimulating ray is cut off and only fluorescence released from the fluorescent substance labeling the specimen upon being stimulated by the laser beam 4 having a wavelength of 640 nm transmits through the first filter 68a and is photoelectrically detected by the first photomultiplier 67a.

On the other hand, since the second filter 68b has a property of cutting off light having a wavelength of 532 nm but transmitting light having a wavelength longer than 532 nm, light having a wavelength of 532 nm equal to that of the stimulating ray is cut off and only fluorescence released from the fluorescent substance labeling the specimen upon being stimulated by the laser beam 4 having a wavelength of 532 nm transmits through the second filter 68b and is photoelectrically detected by the second photomultiplier 67b.

As described above, in accordance with the image reading apparatus according to this embodiment, the filter module 71 provided with the first filter 68a and the second filter 68b, each having a light transmittance property suitable for the wavelength of the laser beam 4 capable of efficiently stimulating a fluorescent substance labeling a specimen contained in the image carrier 22, and the dichroic mirror 70 is selected by a user and set between the perforated mirror 14 and the first and second photomultipliers 67a and 67b. The two kinds of fluorescent substances contained in the image carrier 22 are then stimulated by the laser beams 4. Therefore, the two kinds of fluorescent substances which can be efficiently stimulated by laser beams having different wavelengths can be stimulated by simultaneously irradiating the image carrier 22 carrying a fluorescent image of a specimen selectively labeled with the two kinds of fluorescent substances by laser beams 4 emitted from the two laser stimulating ray sources and fluorescence released from the two kinds of fluorescent substances can be simultaneously detected by the first photomultiplier 67a and the second photomultiplier 67b to thereby obtain two fluorescent images corresponding to the respective fluorescent substances.

Further, according to this embodiment, since the filter module 71 is provided with the first filter 68a and the second filter 68b, all of the beam of fluorescence 25 diverged because a fluorescent substance is distributed in the depth direction of the support and light releasing points are distributed in the depth direction of the support when the fluorescent substance is stimulated can be condensed by the first convex lens 69a via the first filter 68a onto the photoelectrical detecting surface of the first photomultiplier 67a, thereby being detected by the first photomultiplier 67a and can be also condensed by the second convex lens 69b via the second filter 68b onto the photoelectrical detecting surface of the second photomultiplier 67b, thereby being detected by the first photomultiplier 67b. Therefore, it is possible to read fluorescent images with considerably high sensitivity.

On the other hand, when a stimulable phosphor contained in a stimulable phosphor sheet is stimulated using the first laser stimulating ray source 1 and stimulated emission 25 is detected, stimulated emission 25 is released from a portion in the vicinity of the surface of a stimulable phosphor layer formed on the stimulable phosphor sheet, the stimulated emission 25 can be condensed onto the photoelectrical detecting surface of the photomultiplier without using the convex lens 69a, 69b, whereas if the stimulated emission 25 should be condensed by the convex lenses 69a, 69b, the beam of the stimulated emission would diverge. Therefore, in this case, the user selects the filter module 63 shown in FIG. 13, which is provided with neither a convex lens nor a dichroic mirror 70 but is equipped with the filter 64 having a property of transmitting only light having a wavelength corresponding to that of stimulated emission emitted from stimulable phosphor but cutting off light having a wavelength of 640 nm, and sets it between the perforated mirror 14 and the second photomultiplier 67b.

Therefore, according to this embodiment, when a fluorescent image carried in a transfer support or a gel support is to be read, the filter module 71 provided with the first filter 68a and the second filter 68b each having a light transmittance property suitable for the wavelength of the laser beam 4 capable of efficiently stimulating a fluorescent substance labeling a specimen contained in the image carrier 22, the dichroic mirror 70, the first convex lens 69a and the second convex lens 69b is selected by the user and set between the perforated mirror 14 and the first and second photomultipliers 67a and 67b. Therefore, all of the beam of fluorescence 25 diverged because a fluorescent substance is distributed in the depth direction of the support and light releasing points are distributed in the depth direction of the support when the fluorescent substance is stimulated can be condensed by the first convex lens 69a and the second convex lens 69b via the first filter 68a and the second filter 68b onto the photoelectrical detecting surfaces of the first photomultiplier 67a and the second photomultiplier 67b and can be detected by the first photomultiplier 67a and the second photomultiplier 67b. Consequently, it is possible to simultaneously read fluorescent images of a specimen selectively labeled with two kinds of fluorescent substances with high sensitivity. On the other hand, when a stimulable phosphor contained in a stimulable phosphor sheet is stimulated using the first laser stimulating ray source 1 and stimulated emission 25 is detected, the stimulated emission 25 can be condensed onto the photoelectrical detecting surface of the second photomultiplier 67b without using the convex lens 69a, 69b, whereas if the stimulated emission 25 should be condensed by the convex lens 69a, 69b, the beam of the stimulated emission 25 would diverge. According to this embodiment, therefore, the user selects the filter module 63 provided with the filter 64, which has a property of transmitting only light having a wavelength corresponding to that of stimulated emission emitted from stimulable phosphor but cutting off light having a wavelength of 640 nm and is not provided with the convex lenses 69a, 69b and sets it between the perforated mirror 14 and the second photomultiplier 67b. Therefore, it is possible to read an autoradiographic image regarding locational information of a radioactive labeling substance with high sensitivity.

Figure 16:
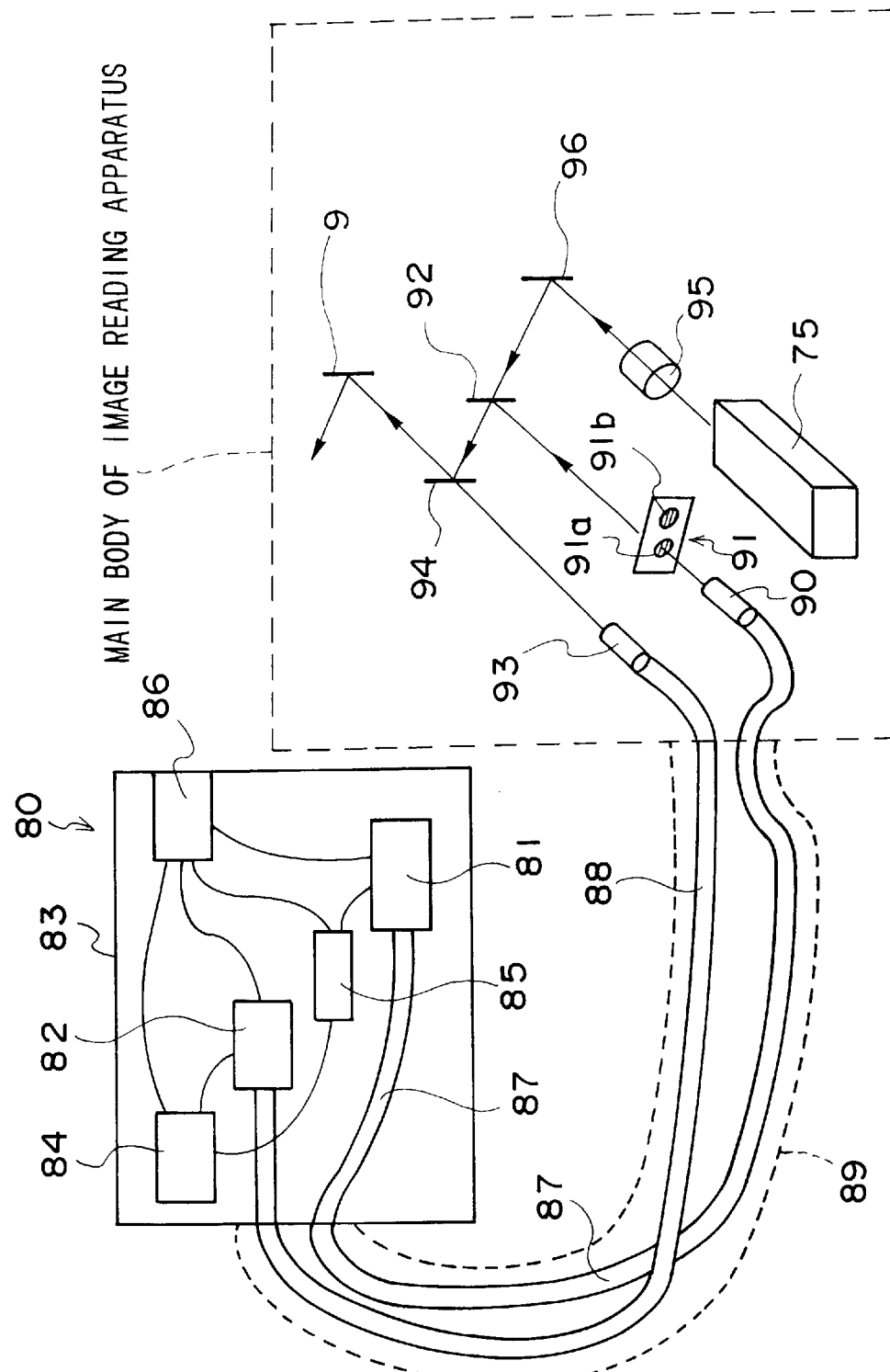
FIG. 16 is a schematic perspective view showing an image reading apparatus which is a further preferred embodiment of the present invention.

FIG. 16 is a schematic perspective view showing an image reading apparatus which is a further preferred embodiment of the present invention. Although optical systems downstream of the mirror 9 are omitted from the drawing for simplicity, the image reading apparatus has optical systems similar to those shown in FIGS. 1 to 6.

As shown in FIG. 16, the image reading apparatus according to this embodiment includes a built-in laser stimulating ray source 75 for emitting a laser beam 4 having a wavelength of 635 nm and an external laser stimulating ray source unit 80.

The external laser stimulating ray source unit 80 includes a first external laser stimulating ray source 81 and a second external laser stimulating ray source 82, which are accommodated in a single case 83. The external laser stimulating ray source unit 80 further includes a control circuit board 84, an argon laser source controller 85 and a DC power source 86.

The built-in laser stimulating ray source 75 is constituted by a semiconductor laser beam source. The first external laser stimulating ray source 81 is constituted by a multi-line type argon laser beam source for emitting a laser beam 4 having a wavelength of 488 nm and a laser beam 4 having a wavelength of 514.5 nm and the second external laser stimulating ray source 82 is constituted by a laser diode for emitting a laser beam having a wavelength of 405 nm.

As shown in FIG. 16, a laser beam 4 emitted from the first external laser stimulating ray source 81 is led through an optical fiber 87 to the main body of the image reading apparatus and a laser beam 4 emitted from the second external laser stimulating ray source 82 is led through an optical fiber 88 to the main body of the image reading apparatus. The optical fiber 87 and the optical fiber 88 are accommodated in a single protective tube 89.

As shown in FIG. 16, the laser beam 4 emitted from the first external laser stimulating ray source 81 and led through the optical fiber 87 to the main body of the image reading apparatus is made a parallel beam by a collimator lens 90 and advances to a first dichroic mirror 92 via a filter 91a or a filter 91b of a filter member 91. The laser beam 4 emitted from the second external laser stimulating ray source 82 and led through the optical fiber 88 to the main body of the image reading apparatus is made a parallel beam by a collimator lens 93 and advances to a second dichroic mirror 94. On the other hand, a laser beam 4 emitted from the built-in laser stimulating ray source 75 is made a parallel beam by a collimator lens 95, is reflected by a mirror 96 and advances to the first dichroic mirror 92.

The first dichroic mirror 92 has a property of transmitting light having a wavelength equal to or longer than 635 nm and reflecting light having a wavelength shorter than 635 nm and the second dichroic mirror 94 has a property of transmitting light having a wavelength equal to or longer than 405 nm and reflecting light having a wavelength shorter than 405 nm. Therefore, the laser beam 4 emitted from the built-in laser stimulating ray source 75, made a parallel beam by the collimator lens 95 and reflected by the mirror 96 transmits through the first dichroic mirror 92 and is reflected by the second dichroic mirror 94. On the other hand, the laser beam 4 emitted from the first external laser stimulating ray source 81, led through the optical fiber 87 to the main body of the image reading apparatus and made a parallel beam by the collimator lens 90 advances to the first dichroic mirror 92 via the filter 91a or the filter 91b of the filter member 91, is reflected by the first dichroic mirror 92 and is reflected by the second dichroic mirror 94. The laser beam 4 emitted from the second external laser stimulating ray source 82, led through the optical fiber 88 to the main body of the image reading apparatus and made a parallel beam by the collimator lens 93 advances to the second dichroic mirror 94 and transmits through the second dichroic mirror 94. The respective laser beams 4 pass from the second dichroic mirror 94 to a mirror 9 along a common optical path.

Figure 17:
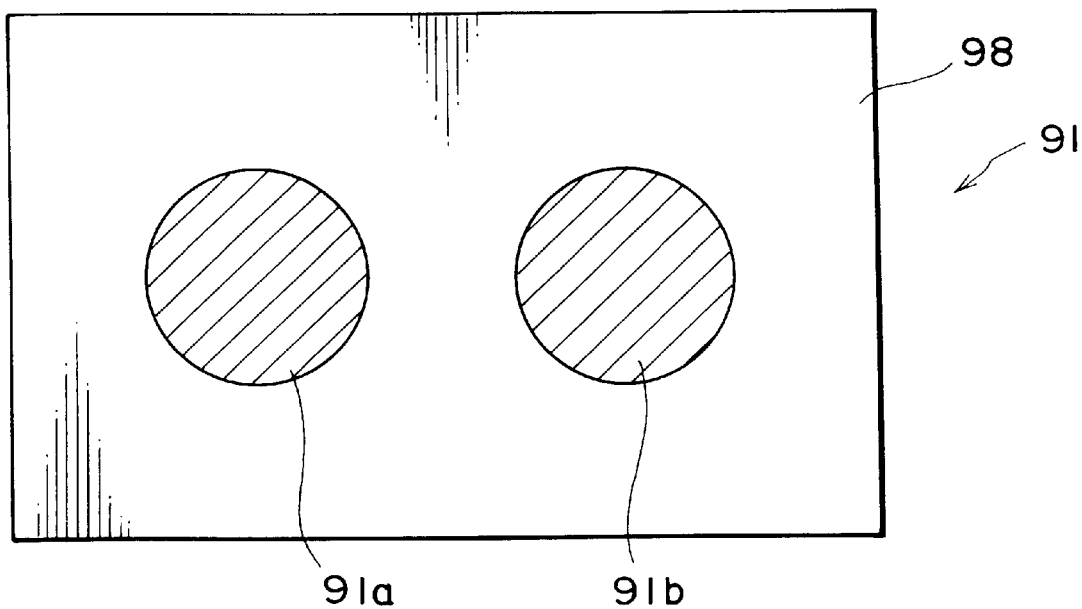
FIG. 17 is a schematic front view showing a filter member.

FIG. 17 is a schematic front view of the filter member.

As shown in FIG. 17, the filter member 91 includes a rectangular plate member 98 formed with the filter 91a and the filter 91b.

The filter 91a has a property of transmitting only light having a wavelength of 488 nm and cutting off light having a wavelength other than 488 nm and the filter 91b has a property of transmitting only light having a wavelength of 514.5 nm and cutting off light having a wavelength other than 514.5 nm. The filter member 91 is movable by a filter member motor described later between a first position where the filter 91a is located in the optical path of the laser beam 4 emitted by the first external laser stimulating ray source 81 and a second position where the filter 91b is located in the optical path of the laser beam 4 emitted by the first external laser stimulating ray source 81.

Figure 18:
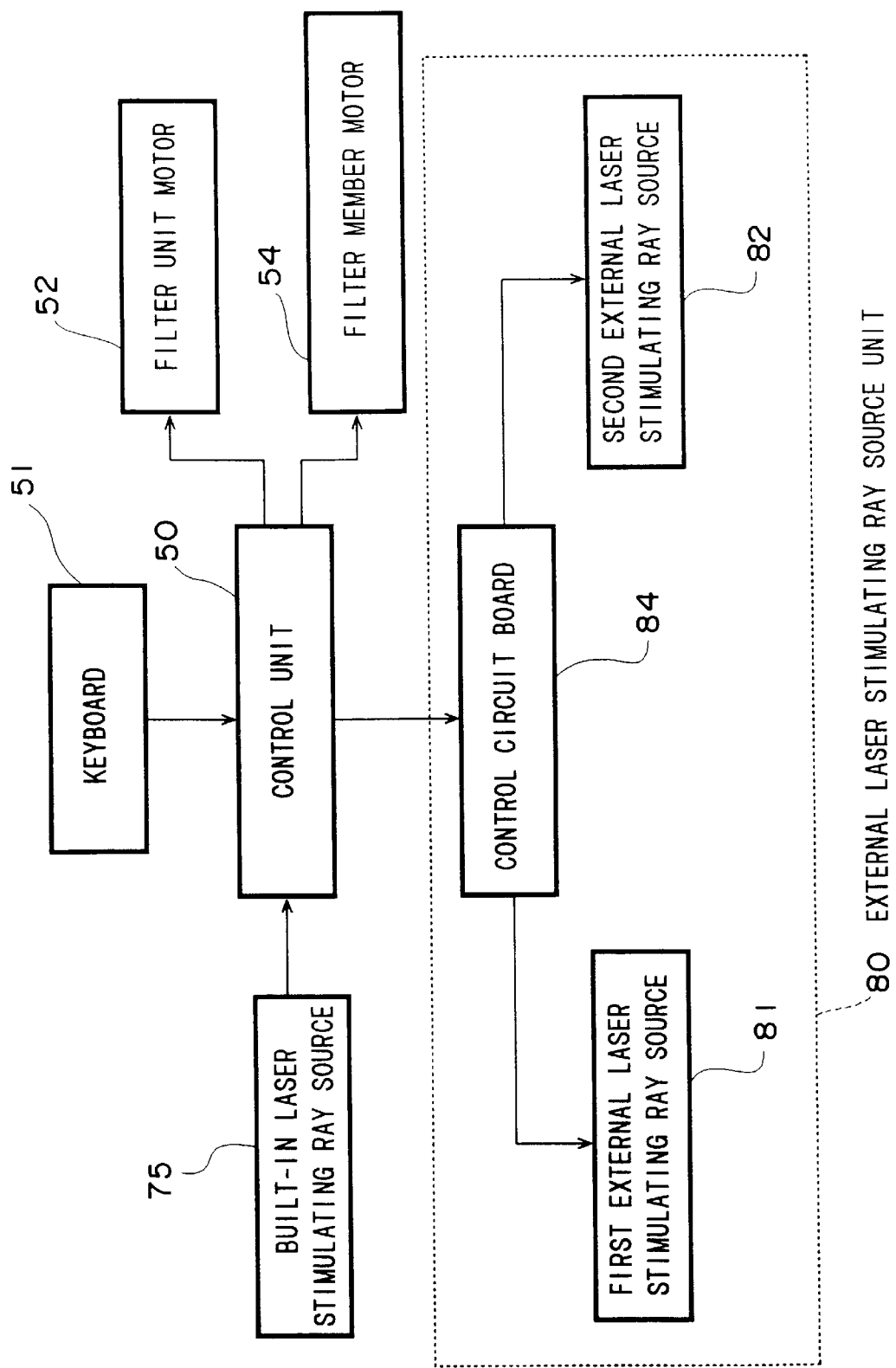
FIG. 18 is a block diagram of a control system, an input system and a drive system of an image reading apparatus which is a further preferred embodiment of the present invention.

FIG. 18 is a block diagram of a control system, an input system and a drive system of an image reading apparatus which is a further preferred embodiment of the present invention.

As shown in FIG. 18, the control system of the image reading apparatus includes a control unit 50 for controlling the entire image reading apparatus, and the input system of the image reading apparatus includes a keyboard 51 which can be operated by an operator and through which various instruction signals can be input. The control circuit board 84 of the external laser stimulating source unit 80 is controlled by the control unit 50.

As shown in FIG. 18, the drive system of the image reading apparatus includes a filter unit motor 52 for moving the filter unit (not shown in FIG. 18) and a filter member motor 54 for moving the filter member 91 between the first position where the filter 91a is located in the optical path of the laser beam 4 emitted by the first external laser stimulating ray source 81 and the second position where the filter 91b is located in the optical path of the laser beam 4 emitted by the first external laser stimulating ray source 81.

In the embodiment shown in FIGS. 1 to 8, the image reading apparatus is constituted so as to read an autoradiographic image regarding locational information of a radioactive labeling substance and recorded in a stimulable phosphor layer formed on a stimulable phosphor sheet, and a fluorescent image of a fluorescent substance contained in a transfer support or a gel support, using three kinds of laser stimulating ray sources for emitting laser beams 4 having different wavelengths from each other. The filter unit 28 is therefore provided with four filter members 31a, 31b, 31c and 31d. However, in this embodiment, the image reading apparatus is constituted so as to read an autoradiographic image regarding locational information of a radioactive labeling substance and recorded in a stimulable phosphor layer formed on a stimulable phosphor sheet, and a fluorescent image of a fluorescent substance contained in a transfer support or a gel support, using four kinds of laser stimulating ray sources for emitting laser beams 4 having different wavelengths from each other. The filter unit is therefore provided with five filter members (not shown). The structure of the filter unit is similar to that of the filter unit 28.

The control unit is constituted so as to output drive signal to the built-in laser stimulating ray source 75 and the control circuit board 84 of the external laser stimulating ray source unit 80, and when the control circuit board 84 receives a drive signal from the control unit 50, it selectively activates the first external laser stimulating ray source 81 or the second external laser stimulating ray source 82 in accordance with the input drive signal. The control unit 50 is further constituted so as to output drive signals to the filter unit motor 52 and the filter member motor 54.

The thus constituted image reading apparatus according to a further preferred embodiment of the present invention reads a fluorescent image carried in a transfer support or a gel support containing a specimen labeled with a fluorescent substance in the following manner.

A transfer support or a gel support is first set on the glass plate of the stage 20.

The kind of fluorescent substance labeling the specimen is then input through the keyboard 51 by the operator and an instruction signal indicating that a fluorescent image carried in the transfer support or the gel support is to be read is input through the keyboard 51.

The instruction signal and the kind of fluorescent substance labeling the specimen input through the keyboard 51 are input to the control unit 50. When the control unit 50 receives them, it determines the laser stimulating ray source to be used in accordance with a table stored in a memory (not shown) and also selects either the filter 91a or the filter 91b of the filter member 91 and determines what filter is to be positioned in the optical path of fluorescence 25 among the five filters (not shown) constituting the filter unit (not shown).

When the specimen is labeled with Fluorescein (registered trademark), which can be most efficiently stimulated by the laser beam having a wavelength of 488 nm among the laser beams 4 having wavelengths of 405 nm, 488 nm, 514.5 nm and 635 nm, the control unit 50 selects the first external laser stimulating ray source 81, the filter 91a of the filter member 91 and a filter having a property of cutting off light having a wavelength of 488 nm and transmitting light having a wavelength longer than 488 nm among five filters (not shown) of the filter unit (not shown), and outputs drive signals to the filter member motor 54 and the filter unit motor 52.

As a result, the filter member 91 is moved so that the filter 91a is located in the optical path of the laser beam 4 emitted from the first external laser stimulating ray source 81 and the filter unit is moved so that the filter having a property of cutting off light having a wavelength of 488 nm and transmitting light having a wavelength longer than 488 nm is located in the optical path of fluorescence 25.

The control unit 50 then outputs a drive signal instructing the control circuit board 84 to activate the first external laser stimulating ray source 81, thereby causing the first external laser stimulating ray source 81 to emit a laser beam 4 having a wavelength of 488 nm.

The laser beam 4 emitted from the first external laser stimulating ray source 81 is led through the optical fiber 87 to the main body of the image reading apparatus, is made a parallel beam by the collimator lens 90 and enters the filter 91a of the filter member 91.

The laser beam 4 emitted from the first external laser stimulating ray source 81 has peak wavelengths of 488 nm and 514.5 nm. However, since the filter 91a has a property of transmitting only light having a wavelength of 488 nm and cutting off light having a wavelength other than 488 nm, the laser beam 4 having a wavelength of 514.5 nm is cut and only the laser beam 4 having a wavelength of 488 nm transmits through the filter 91a and advances to the first dichroic mirror 92.

Since the first dichroic mirror 92 has a property of transmitting light having a wavelength equal to or longer than 635 nm and reflecting light having a wavelength shorter than 635 nm, the laser beam 4 is reflected by the first dichroic mirror 92 and advances to the second dichroic mirror 94.

Since the second dichroic mirror 94 has a property of transmitting light having a wavelength of 405 nm and reflecting light longer than 405 nm, the laser beam 4 is reflected by the second dichroic mirror 94 and advances to the mirror 9.

The laser beam 4 is reflected by the mirror 9 and further reflected by the mirror 12, thereby advancing to the perforated mirror 14.

The laser beam 4 advancing to the perforated mirror 14 passes through the hole 13 formed at the center of the perforated mirror 14 and advances to the concave mirror 18.

The laser beam 4 entering the concave mirror 18 is reflected by the concave mirror 18 and enters the optical head 15.

The laser beam 4 entering the optical head 15 is reflected by the mirror 16 and is condensed by the aspherical lens 17 onto a transfer support or a gel support placed on the glass plate 21 of the stage 20.

As a result, Fluorescein (registered trademark) contained in the transfer support or the gel support as a fluorescent substance is stimulated by the laser beam 4 and fluorescence 25 is released from the Fluorescein.

The fluorescence 25 released from the Fluorescein is made a parallel beam by the aspherical lens 17 provided in the optical head 15 and is reflected by the mirror 16 on the side of the optical path of the laser beam 4 so as to be a parallel beam and impinges on the concave mirror 18.

The fluorescence 25 impinging on the concave mirror 18 is reflected by the concave mirror 18 and advances to the perforated mirror 14.

As shown in FIG. 2, the fluorescence 25 advancing to the perforated mirror 14 is reflected by the perforated mirror 14 and advances to the filter unit.

Since the filter unit has been moved so that the filter having a property of cutting light having a wavelength of 488 nm and cutting off light having a wavelength longer than 488 nm is located in the optical path of the fluorescence 25, light having a wavelength of 488 nm is cut by the filter unit and only light having a wavelength corresponding to that of the fluorescence released from Fluorescein transmits through the filter and is photoelectrically detected by the photomultiplier 30.

As described above, since the optical head 15 is moved on the base plate 43 in the X direction in FIG. 7 by the main scanning pulse motor 45 mounted on the base plate 43 and the base plate 43 is moved in the Y direction in FIG. 7 by the sub-scanning pulse motor 41, the whole surface of the transfer support or the gel support is scanned by the laser beam 4. Therefore, the photomultiplier 30 can read a fluorescent image of the fluorescent substance Fluorescein recorded in the transfer support or the gel support and produce analog image data by photoelectrically detecting the fluorescence 25 released from Fluorescein contained in the transfer support or the gel support and labeling the specimen.

The analog image data produced by photoelectrically detecting the stimulated emission 25 are converted by the A/D converter 33 into digital image data and the digital data are fed to the image data processing apparatus 34.

In the case where the image carrier 22 carries a fluorescent image of a specimen labeled with a fluorescent substance which can be efficiently stimulated by a laser beam 4 having a wavelength of 514.5 nm, the first external laser stimulating ray source 81 is similarly activated. In this case, the control unit 50 outputs a drive signal to the filter member motor 54 to cause it to move the filter member 91 to the second position where the filter 91b is located in the optical path of the laser beam 4 emitted from the first external laser stimulating ray source 81 and outputs a drive signal to the filter unit motor 52 to cause it to move the filter unit (not shown) so that the filter having a property of cutting off light having a wavelength of 514.5 nm and transmitting light having a wavelength longer than 514.5 nm is located in the optical path of fluorescence. The first external laser stimulating ray source 81 is then activated. As a result, the wavelength component of 488 nm of the laser beam 4 emitted by the first external laser stimulating ray source 81 and having a peak wavelength of 488 nm is cut off and the fluorescent substance contained in the image carrier 22 can be efficiently stimulated by the laser beam 4 having a wavelength of 514.5 nm, and only fluorescence released from the image carrier 22 can be photoelectrically detected by the photomultiplier 30 by cutting off light having a wavelength of 514.5 nm equal to the wavelength of the stimulating ray.

On the other hand, in the case where the image carrier 22 carries a fluorescent image of a specimen labeled with a fluorescent substance which can be efficiently stimulated by a laser beam 4 having a wavelength of 405 nm, the second external laser stimulating ray source 82 is activated. In this case, the control unit 50 outputs a drive signal to the filter unit motor 52 to cause it to move the filter unit (not shown) so that a filter having a property of cutting off light having a wavelength of 405 nm and transmitting light having a wavelength longer than 405 nm is located in the optical path of the fluorescence 25, whereby only fluorescence released from the image carrier 22 can be photoelectrically detected by the photomultiplier 30 by cutting off light having a wavelength of 405 nm equal to the wavelength of the stimulating ray.

Further, in the case where the image carrier 22 carries a fluorescent image of a specimen labeled with a fluorescent substance such as Cy5 (registered trademark) which can be efficiently stimulated by a laser beam 4 having a wavelength of 635 nm, the built-in laser stimulating ray source 75 is activated. Prior to activating the built-in laser stimulating ray source 75, the control unit 50 outputs a drive signal to the filter unit motor 52 to cause it to move the filter unit (not shown) so that a filter having a property of cutting off light having a wavelength of 635 nm and transmitting light having a wavelength longer than 635 nm is located in the optical path of the fluorescence 25, whereby only fluorescence released from the image carrier 22 can be photoelectrically detected by the photomultiplier 30 by cutting off light having a wavelength of 635 nm equal to the wavelength of the stimulating ray On the other hand, in the case where an autoradiographic image regarding locational information of a radioactive labeling substance and recorded in a stimulable phosphor layer formed on a stimulable phosphor sheet is read, the built-in laser stimulating ray source 75 is activated. Prior to activating the built-in laser stimulating ray source 75, the control unit 50 outputs a drive signal to the filter unit motor 52 to cause it to move the filter unit (not shown) so that a filter having a property of cutting off light having a wavelength of 635 nm and transmitting only light having a wavelength corresponding to the wavelength of stimulated emission 25 is located in the optical path of stimulated emission 25, whereby only stimulated emission released from the image carrier 22 can be photoelectrically detected by the photomultiplier 30 by cutting off light having a wavelength of 635 nm equal to the wavelength of the stimulating ray.

According to this embodiment, the external laser stimulating ray source unit 80 includes the first external laser stimulating ray source 81 and the second external laser stimulating ray source 82 accommodated in the single case 83. Therefore, the first external laser stimulating ray source 81 and the second external laser stimulating ray source 82 can be driven by a single DC power source 86. Further, the optical fiber 87 for leading a laser beam 4 emitted from the first external laser stimulating ray source 81 to the main body of the image reading apparatus and the optical fiber 88 for leading a laser beam 4 emitted from the second external laser stimulating ray source 82 to the main body of the image reading apparatus are accommodated in a single protective tube 89. Therefore, the image reading apparatus provided with the external laser stimulating ray source unit 80 can be manufactured at a lower cost than an image reading apparatus constituted to have a plurality of external laser stimulating ray sources accommodated in separate cases and optical fibers for leading laser beams emitted from the respective external laser stimulating ray sources to the main body of the image reading apparatus.

Further, according to this embodiment, the laser beam 4 emitted from the first external laser stimulating ray source 81 is led through the optical fiber 87 to the main body of the image reading apparatus and the laser beam 4 emitted from the second external laser stimulating ray source 82 is led through the optical fiber 88 to the main body of the image reading apparatus and are then led by the first dichroic mirror 92 and the second dichroic mirror 94 to the mirror 9 along a common optical path. Therefore, since it is possible to align the optical paths of the laser beams emitted from a plurality of external laser stimulating ray sources with each other with high accuracy as compared with the case of providing a plurality of external laser stimulating ray sources in a single case, aligning the optical paths of laser beams emitted from the plurality of external laser stimulating ray sources with each other and leading them through a single optical fiber to the main body of the image reading apparatus, it is possible to simultaneously read fluorescent images of a specimen selectively labeled with two or more fluorescent substances by aligning optical paths of laser beams emitted from two or more external laser stimulating ray sources, stimulating the fluorescent substances contained in the image carrier 22 by the laser beams and detecting fluorescence released from the fluorescent substances and produce fluorescent images having high resolution.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, explanation was made with regard to the photoelectrical reading of an electrophoresis image of a gene obtained using by a Southern blot-hybridization method and recorded in a transfer support or a gel support in accordance with a fluorescent image detection system, and an electrophoresis image of a gene obtained using by a Southern blot-hybridization method and recorded in a stimulable phosphor layer formed on a stimulable phosphor sheet in accordance with the autoradiographic image detecting system. However, the present invention is not limited to such image reading but can also be applied to various other types of image reading. Specifically, the present invention can also be applied to reading of other images of fluorescent substances such as those recorded in a gel support or a transfer support in accordance with a fluorescent image detection system, images of fluorescent substances for the separation or identification of a protein or the estimation of the molecular weight or properties of a protein or the like, autoradiographic images of a protein produced by thin layer chromatography (TLC) and recorded in the stimulable phosphor layer formed on a stimulable phosphor sheet, autoradiographic images produced by polyacrylamide gel electrophoresis for the separation or identification of a protein or the estimation of the molecular weight or properties of a protein or the like and recorded in the stimulable phosphor layer formed on a stimulable phosphor sheet, and autoradiographic images recorded in the stimulable phosphor layer formed on a stimulable phosphor sheet for studying the metabolism, absorption, excretion path and state of a substance introduced into a test mouse. Further, the present invention is applicable to reading of an electron beam transmission image or an electron beam diffraction image of a metal or nonmetal produced by an electron microscope and an electron microscope image of tissue of an organism recorded in the stimulable phosphor layer formed on a stimulable phosphor sheet, a radiographic diffraction image of a metal or nonmetal recorded in the stimulable phosphor layer formed on a stimulable phosphor sheet, and a chemiluminescent image recorded in the stimulable phosphor layer formed on a stimulable phosphor sheet.

Moreover, in the above described embodiments shown in FIGS. 1 to 15, although the image reading apparatus includes the first laser stimulating ray source 1, the second laser stimulating ray source 2 and the third laser stimulating ray source 3, it is not absolutely necessary for the image reading apparatus to include three laser stimulating ray sources and it is sufficient for the image reading apparatus to be able to read a fluorescent image carried in a transfer support or a gel support, and at least one kind of image including an autoradiographic image regarding locational information of a radioactive labeling substance and recorded in the stimulable phosphor layer formed on a stimulable phosphor sheet, an electron beam transmission image or an electron beam diffraction image of a metal or nonmetal and an electron microscope image of tissue of an organism recorded in the stimulable phosphor layer formed on a stimulable phosphor sheet, a radiographic diffraction image of a metal or nonmetal recorded in the stimulable phosphor layer formed on a stimulable phosphor sheet, and a chemiluminescent image recorded in the stimulable phosphor layer formed on a stimulable phosphor sheet. For example, the second laser stimulating ray source 2 may be omitted or the image reading apparatus may be constituted by providing only the first laser stimulating ray source 1 so as to read a fluorescent image produced by labeling a specimen with Cy5 (registered trademark) or the like, which can be efficiently excited by a laser beam having a wavelength of 640 nm, an autoradiographic image regarding locational information, an electron microscope image, a radiographic diffraction image and a chemiluminescent image recorded in the stimulable phosphor layer formed on a stimulable phosphor sheet.

Furthermore, in the embodiments shown in FIGS. 1 to 15, although a semiconductor laser beam source for emitting a laser beam 4 having a wavelength of 640 nm is employed as the first laser stimulating ray source 1, a He—Ne laser beam source for emitting a laser beam 4 having a wavelength of 633 nm or a semiconductor laser beam source for emitting a laser beam 4 having a wavelength of 635 nm may be employed instead of the semiconductor laser beam source for emitting a laser beam 4 having a wavelength of 640 nm.

Moreover, in the embodiments shown in FIGS. 1 to 15, a laser beam source for emitting a laser beam 4 having a wavelength of 532 nm is used as the second laser stimulating ray source 2 and a laser beam source for emitting a laser beam 4 having a wavelength of 473 nm is used as the third laser stimulating ray source 3. However, depending upon the kind of fluorescent substance, a laser beam source for emitting a laser beam 4 having a wavelength of 530 to 540 nm may be used as the second laser stimulating ray source 2 and a laser beam source for emitting a laser beam 4 having a wavelength of 470 to 480 nm, for example, an argon laser beam source for emitting a laser beam 4 having a wavelength of 488 nm, may be used as the third laser stimulating ray source 3.

Further, in the embodiment shown in FIG. 11, although the convex lens 60 is provided between the photomultiplier 30 and the filter unit 28, the convex lens 60 may be provided between the perforated mirror 14 and the filter unit 28.

Furthermore, the concave mirror 61 is provided in the optical path of fluorescence 25 or stimulated emission 25 transmitted through the filter unit 28 in the embodiment shown in FIG. 12 and the filter module exchangeable by the user is provided between the perforated mirror 14 and the concave mirror 62 in the embodiment shown in FIG. 13. However, fluorescence 25 or stimulated emission 25 may be condensed toward the filter unit 28 or the filter module 63 by providing the concave mirror 61 or the concave mirror 62 in the optical path of fluorescence 25 or stimulated emission 25 reflected by the perforated mirror 14.

Moreover, in the embodiment shown in FIG. 14, although the filter module 65 exchangeable by the user is constituted so that fluorescence 25 or stimulated emission 25 is condensed by the convex lens 66 onto the filter 64, the filter module 65 may be constituted so that fluorescence 25 or stimulated emission 25 transmitted through the filter 64 impinges on the convex lens 66.

Further, in the embodiment shown in FIG. 14, although the filter module 65 exchangeable by the user is provided with the convex lens 66 for condensing fluorescence 25 or stimulated emission 25, the filter module 65 may instead be provided with another type of condensing optical systems such as a concave mirror for condensing fluorescence 25 or stimulated emission 25.

Furthermore, in the embodiment shown in FIG. 15, the filter module 71 exchangeable by the user is constituted so that fluorescence 25 or stimulated emission 25 is condensed by the first convex lens 69a onto the first filter 68a and that fluorescence 25 or stimulated emission 25 is condensed by the second convex lens 69b onto the second filter 68b. However, the filter module 71 may be constituted so that fluorescence 25 or stimulated emission 25 transmitted through the first filter 68a enters the first convex lens 69a and that fluorescence 25 or stimulated emission 25 transmitted through the second filter 68b enters the second convex lens 69b.

Moreover, in the embodiment shown in FIG. 15, the filter module 71 exchangeable by the user is constituted so that fluorescence 25 or stimulated emission 25 is condensed by the first convex lens 69a onto the first filter 68a and that fluorescence 25 or stimulated emission 25 is condensed by the second convex lens 69b onto the second filter 68b. However, both the first convex lens 69a and the second convex lens 69b or one of the first convex lens 69a and the second convex lens 69b of the filter module 71 may be replaced with another type of condensing optical system such as a concave mirror for condensing fluorescence 25 or stimulated emission 25.

Further, in the embodiment shown in FIGS. 16 to 18, the image reading apparatus is provided with the built-in laser stimulating ray source 75 for emitting a laser beam 4 having a wavelength of 635 nm, and with the external laser stimulating ray source unit 80 including the first laser stimulating ray source 81 for emitting a laser beam 4 having peak wavelengths of 488 nm and 514.5 nm and the second laser stimulating ray source 82 for emitting a laser beam 4 having a wavelength of 405 nm. However, the wavelength of the laser beam 4 emitted from the built-in laser stimulating ray source 75 and the wavelengths of the laser beams 4 emitted from the first laser stimulating ray source 81 and the second laser stimulating ray source 82 can be arbitrarily determined.

Furthermore, in the embodiment shown in FIGS. 16 to 18, the external laser stimulating ray source unit 80 is provided with the first laser stimulating ray source 81 and the second laser stimulating ray source 82. However, it is not absolutely necessary for the external laser stimulating ray source unit 80 to include two external laser stimulating ray sources and the external laser stimulating ray source unit 80 may include only a single external laser stimulating ray source or three or more external laser stimulating ray sources.

Moreover, the photomultiplier 30, 67a, or 67b is employed as a light detector to photoelectrically detect fluorescence or stimulated emission released from the image carrier 22 in the above described embodiments. However, it is sufficient for the light detector used in the present invention to be able to photoelectrically detect fluorescence or stimulated emission and it is possible to employ a light detector such as a photodiode and a CCD instead of the photomultiplier 30, 67a, or 67b.

According to the present invention, it is possible to provide, without increase in cost, an image reading apparatus which can read an image at a high speed by moving an optical head at a high speed and scanning an image carrier by a laser beam and can be used in common for an autoradiographic image detecting system, a chemiluminescent image detecting system, an electron microscopic image detecting system and a radiographic diffraction image detecting system using a stimulable phosphor sheet, and a fluorescent image detecting system.

What is claimed is:

1. An image reading apparatus comprising at least one laser stimulating ray source for emitting a laser beam, a stage on which an image carrier can be placed, a light detecting means for photoelectrically detecting light released from the image carrier, and an optical head for condensing the laser beam emitted from the at least one laser stimulating ray source onto the image carrier placed on the stage and condensing light released from the image carrier to lead it to the light detecting means, the optical head being constituted to be two-dimensionally movable in a plane parallel to the stage and said image reading apparatus being further provided with a perforated mirror fixed in a path of the laser beam and formed with a hole at a center portion thereof, the perforated mirror being disposed so that the laser beam emitted from the at least one laser stimulating ray source can pass through the hole thereof and light released from the image carrier and condensed by the optical head can be reflected by the perforated mirror in such a manner that a path of the light is branched off from the path of the laser beam emitted from the at least one laser stimulating ray source and advancing to the optical head.

2. An image reading apparatus in accordance with claim 1 wherein the optical head further includes a reflection mirror for directing the laser beam emitted from the at least one laser stimulating ray source toward the image carrier placed on the stage, and a lens system for condensing the laser beam emitted from the at least one laser stimulating ray source and reflected by the reflection mirror onto the image carrier, making light released from the image carrier a parallel beam and causing it to impinge on the reflection mirror, the reflection mirror being constituted so as to reflect the light released from the image carrier and made a parallel beam by the lens system toward the perforated mirror.

3. An image reading apparatus in accordance with claim 1 wherein the optical head further includes a concave mirror for directing the laser beam emitted from the at least one laser stimulating ray source toward the image carrier, condensing it onto the image carrier and reflecting light released from the image carrier toward the perforated mirror so as to be made a parallel beam.

4. An image reading apparatus in accordance with claim 2 wherein the lens system is constituted by an aspherical lens.

5. An image reading apparatus in accordance with claim 2 wherein the lens system is constituted by a convex lens.

6. An image reading apparatus in accordance with claim 1 which further comprises a condensing optical system for leading the light released from the image carrier, condensed by the optical head and reflected by the perforated mirror to the light detecting means.

7. An image reading apparatus in accordance with claim 1 which comprises two or more laser stimulating ray sources for emitting laser beams having different wavelengths from each other.

8. An image reading apparatus in accordance with claim 7 which further comprises a condensing optical system for leading the light released from the image carrier, condensed by the optical head and reflected by the perforated mirror to the light detecting means.

9. An image reading apparatus in accordance with claim 8 which further comprises a stimulating ray cut filter unit provided with two or more stimulating ray cut filters each having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and the stimulating ray cut filter unit is constituted to be movable so that one of the two or more stimulating ray cut filters is selectively located in a path of light released from the image carrier, condensed by the optical head and reflected by the perforated mirror.

10. An image reading apparatus in accordance with claim 9 wherein the condensing optical system is constituted so as to lead light transmitted through the stimulating ray cut filter unit to the light detecting means.

11. An image reading apparatus in accordance with claim 9 wherein the condensing optical system is constituted so as to condense light released from the image carrier, condensed by the optical head and reflected by the perforated mirror onto the stimulating ray cut filter unit, thereby leading it to the light detecting means.

12. An image reading apparatus in accordance with claim 8 which further comprises a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources, and the stimulating ray cut filter module is constituted to be exchangeable and locatable in a path of light released from the image carrier, condensed by the optical head and reflected by the perforated mirror.

13. An image reading apparatus in accordance with claim 12 wherein the condensing optical system is constituted so as to lead light transmitted through the stimulating ray cut filter module to the light detecting means.

14. An image reading apparatus in accordance with claim 12 wherein the condensing optical system is constituted so as to condense light released from the image carrier, condensed by the optical head and reflected by the perforated mirror onto the stimulating ray cut filter module, thereby leading it to the light detecting means.

15. An image reading apparatus in accordance with claim 7 which further comprises a stimulating ray cut filter module provided with a stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from the one of the laser stimulating ray sources and a condensing optical system for leading light released from the image carrier, condensed by the optical head and reflected by the perforated mirror to the light detecting means, and the stimulating ray cut filter module is constituted to be exchangeable and locatable in a path of light released from the image carrier, condensed by the optical head and reflected by the perforated mirror.

16. An image reading apparatus in accordance with claim 15 wherein the condensing optical system is constituted so as to lead light transmitted through the stimulating ray cut filter module to the light detecting means.

17. An image reading apparatus in accordance with claim 15 wherein the condensing optical system is constituted so as to condense light released from the image carrier, condensed by the optical head and reflected by the perforated mirror onto the stimulating ray cut filter module, thereby leading it to the light detecting means.

18. An image reading apparatus in accordance with claim 15 wherein the condensing optical system is constituted by a convex lens.

19. An image reading apparatus in accordance with claim 15 wherein the condensing optical system is constituted by a concave mirror.

20. An image reading apparatus in accordance with claim 7 which further comprises a first light detecting means and a second light detecting means for photoelectrically detecting light emitted from the image carrier, and a stimulating ray cut filter module provided with a first stimulating ray cut filter having a property of cutting off light having a wavelength of the laser beam emitted from one of the laser stimulating ray sources among the two or more laser stimulating ray sources and transmitting light having a wavelength longer than the wavelength of the laser beam emitted from said one of the laser stimulating ray sources, a second stimulating ray cut filter having a property of cutting off light having a wavelength of the laser beam emitted from a laser stimulating ray source different from said one of the laser stimulating ray sources among the two or more laser stimulating ray sources and transmitting light having a wavelength longer than the wavelength of the laser beam emitted from the laser stimulating ray source different from said one of the laser stimulating ray sources, a dichroic mirror having a property of reflecting light having a wavelength longer than the wavelength of the laser beam emitted from said one of the laser stimulating ray sources and transmitting light having a wavelength longer than the wavelength of the laser beam emitted from the laser stimulating ray source different from said one of the laser stimulating ray sources, a first condensing optical system for condensing light released from the image carrier and reflected by the dichroic mirror onto the first light detecting means, and a second condensing optical system for condensing light released from the image carrier and transmitted through the dichroic mirror onto the second light detecting means, the stimulating ray cut filter module being constituted to be exchangeable and locatable in a path of the light released from the image carrier, condensed by the optical head and reflected by the perforated mirror.

21. An image reading apparatus in accordance with claim 20 wherein the first condensing optical system is constituted so as to lead light transmitted through the first stimulating ray cut filter to the first light detecting means.

22. An image reading apparatus in accordance with claim 20 wherein the first condensing optical system is constituted so as to condense light released from the image carrier and reflected by the dichroic mirror onto the first stimulating ray cut filter, thereby leading it to the first light detecting means.

23. An image reading apparatus in accordance with claim 20 wherein the second condensing optical system is constituted so as to lead light transmitted through the second stimulating ray cut filter to the second light detecting means.

24. An image reading apparatus in accordance with claim 20 wherein the second condensing optical system is constituted so as to condense light released from the image carrier and transmitted through the dichroic mirror onto the second stimulating ray cut filter, thereby leading it to the second light detecting means.

25. An image reading apparatus in accordance with claim 20 wherein the first condensing optical system is constituted by a convex lens.

26. An image reading apparatus in accordance with claim 20 wherein the second condensing optical system is constituted by a convex lens.

27. An image reading apparatus in accordance with claim 20 wherein the first condensing optical system is constituted by a concave mirror.

28. An image reading apparatus in accordance with claim 20 wherein the second condensing optical system is constituted by a concave mirror.

29. An image reading apparatus in accordance with claim 1 wherein the at least one laser stimulating ray source includes at least one built-in laser stimulating ray source and which further comprises an external laser stimulating ray source unit including a single case, at least two external laser stimulating ray sources accommodated in the case, at least two optical fiber members each for leading a laser beam emitted from one of the at least two external laser stimulating ray sources to a main body of the image reading apparatus, and a single protective tube member for covering and protecting the at least two optical fiber members.

30. An image reading apparatus in accordance with claim 20 wherein the at least one laser stimulating ray source includes at least one built-in laser stimulating ray source and which further comprises an external laser stimulating ray source unit including a single case, at least two external laser stimulating ray sources accommodated in the case, at least two optical fiber members each for leading a laser beam emitted from one of the at least two external laser stimulating ray sources to a main body of the image reading apparatus, and a single protective tube member for covering and protecting the at least two optical fiber members.

31. An image reading apparatus in accordance with claim 7 which comprises two or more built-in laser stimulating ray sources for emitting laser beams having different wavelengths from each other and further comprises an external laser stimulating ray source unit including a single case, at least two external laser stimulating ray sources accommodated in the case, at least two optical fiber members each for leading a laser beam emitted from one of the at least two external laser stimulating ray sources to a main body of the image reading apparatus, and a single protective tube member for covering and protecting the at least two optical fiber members.

32. An image reading apparatus in accordance with claim 1 wherein the image carrier includes a support for carrying a fluorescent image produced by a fluorescent image detection system.

33. An image reading apparatus in accordance with claim 7 wherein the image carrier includes a support for carrying a fluorescent image produced by a fluorescent image detection system.

34. An image reading apparatus in accordance with claim 20 wherein the image carrier includes a support for carrying a fluorescent image produced by a fluorescent image detection system.

35. An image reading apparatus in accordance with claim 1 wherein the image carrier includes a stimulable phosphor sheet selected from a group consisting of a stimulable phosphor sheet for carrying an autoradiographic image, a stimulable phosphor sheet carrying an electron microscopic image, a stimulable phosphor sheet carrying a radiographic diffraction image and a stimulable phosphor sheet carrying a chemiluminescent image.

36. An image reading apparatus in accordance with claim 7 wherein the image carrier includes a stimulable phosphor sheet selected from a group consisting of a stimulable phosphor sheet for carrying an autoradiographic image, a stimulable phosphor sheet carrying an electron microscopic image, a stimulable phosphor sheet carrying a radiographic diffraction image and a stimulable phosphor sheet carrying a chemiluminescent image.

37. An image reading apparatus in accordance with claim 20 wherein the image carrier includes a stimulable phosphor sheet selected from a group consisting of a stimulable phosphor sheet for carrying an autoradiographic image, a stimulable phosphor sheet carrying an electron microscopic image, a stimulable phosphor sheet carrying a radiographic diffraction image and a stimulable phosphor sheet carrying a chemiluminescent image.

* * * * *